United States Patent
Sugawara et al.

(10) Patent No.: US 10,352,710 B2
(45) Date of Patent: Jul. 16, 2019

(54) NAVIGATION SERVER, NAVIGATION CLIENT, AND NAVIGATION METHOD

(71) Applicant: HONDA MOTOR CO., LTD., Tokyo (JP)

(72) Inventors: Aiko Sugawara, Tokyo (JP); Takuro Masuda, Tokyo (JP); Hiroshi Inoue, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 96 days.

(21) Appl. No.: 15/247,377

(22) Filed: Aug. 25, 2016

(65) Prior Publication Data
US 2017/0059339 A1    Mar. 2, 2017

(30) Foreign Application Priority Data

Aug. 31, 2015 (JP) .................................. 2015-170854

(51) Int. Cl.
*G01C 21/34* (2006.01)
*G08G 1/0968* (2006.01)

(52) U.S. Cl.
CPC ..... *G01C 21/3415* (2013.01); *G01C 21/3461* (2013.01); *G01C 21/3484* (2013.01); *G08G 1/096811* (2013.01); *G08G 1/096838* (2013.01)

(58) Field of Classification Search
CPC ............ G01C 21/3415; G01C 21/3461; G01C 21/3484; G01C 21/3407; G01C 21/3492;
(Continued)

(56) References Cited

U.S. PATENT DOCUMENTS

2004/0049339 A1*  3/2004  Kober ................ G01C 21/3492
                                          701/533
2004/0215389 A1*  10/2004  Hirose ............... G01C 21/3461
                                          701/410
(Continued)

FOREIGN PATENT DOCUMENTS

JP          07-129893 A      5/1995
JP          11-051682 A      2/1999
(Continued)

OTHER PUBLICATIONS

Japanese Office Action corresponding patent application No. 2015-170854 dated Sep. 18, 2018.

*Primary Examiner* — Abby Y Lin
(74) *Attorney, Agent, or Firm* — Squire Patton Boggs (US) LLP

(57) ABSTRACT

Provided is a navigation server, a navigation client, and a navigation method that allow for searching for a route estimated to have a low degree of making a user feel burdened. A server cost recognition correction element 12 evaluates, for at least one of a plurality of indices representing one or both of a road environment of a subject segment and a relative relationship between the subject segment and one or more of other segments included in the server route candidate, a segment cost index value representing a traffic difficulty of the subject segment, and corrects a cost of the subject segment using the segment cost index value of the subject segment (STEP234, STEP236, STEP239, STEP241, STEP244, STEP247, STEP249, STEP350, and STEP450).

12 Claims, 10 Drawing Sheets

(58) Field of Classification Search
CPC .......... G01C 21/3691; G01C 21/3453; G08G
1/096827; G08G 1/096811; G08G
1/096838; G06Q 10/04; G06Q 10/047
See application file for complete search history.

(56) References Cited

U.S. PATENT DOCUMENTS

| | | | |
|---|---|---|---|
| 2009/0312942 A1* | 12/2009 | Froeberg | G01C 21/3461 |
| | | | 701/532 |
| 2013/0035854 A1* | 2/2013 | Zhang | G01C 21/367 |
| | | | 701/455 |
| 2016/0202069 A1* | 7/2016 | Wippler, III | G01C 21/26 |
| | | | 701/400 |
| 2017/0053531 A1* | 2/2017 | Ullrich | G08G 1/096811 |
| 2017/0059351 A1* | 3/2017 | Kawamukai | G01C 21/3461 |

FOREIGN PATENT DOCUMENTS

| | | |
|---|---|---|
| JP | 2002-310701 A | 10/2002 |
| JP | 2004-325357 A | 11/2004 |
| JP | 2008-139208 A | 6/2008 |
| JP | 2012-058229 A | 3/2012 |

\* cited by examiner

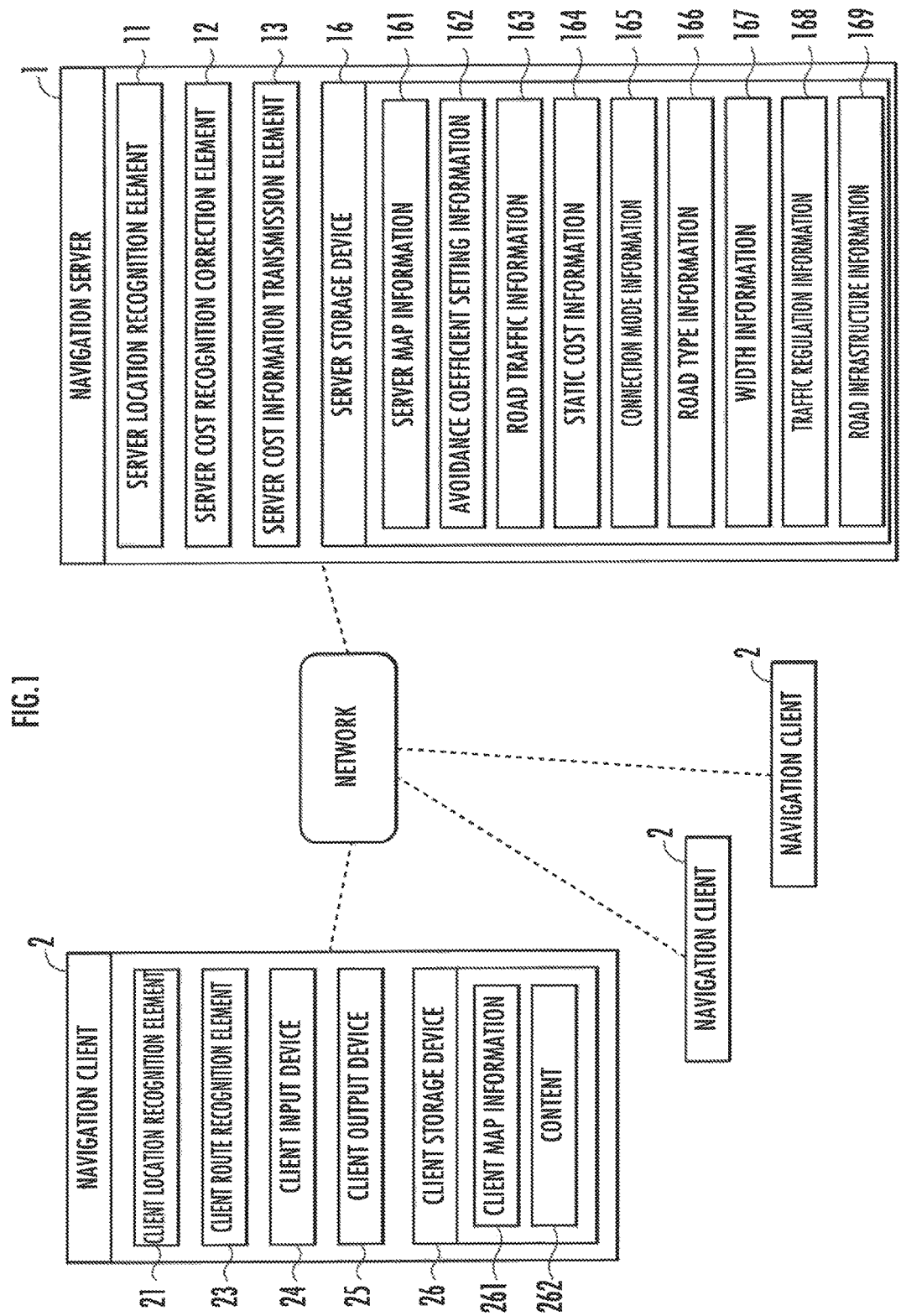

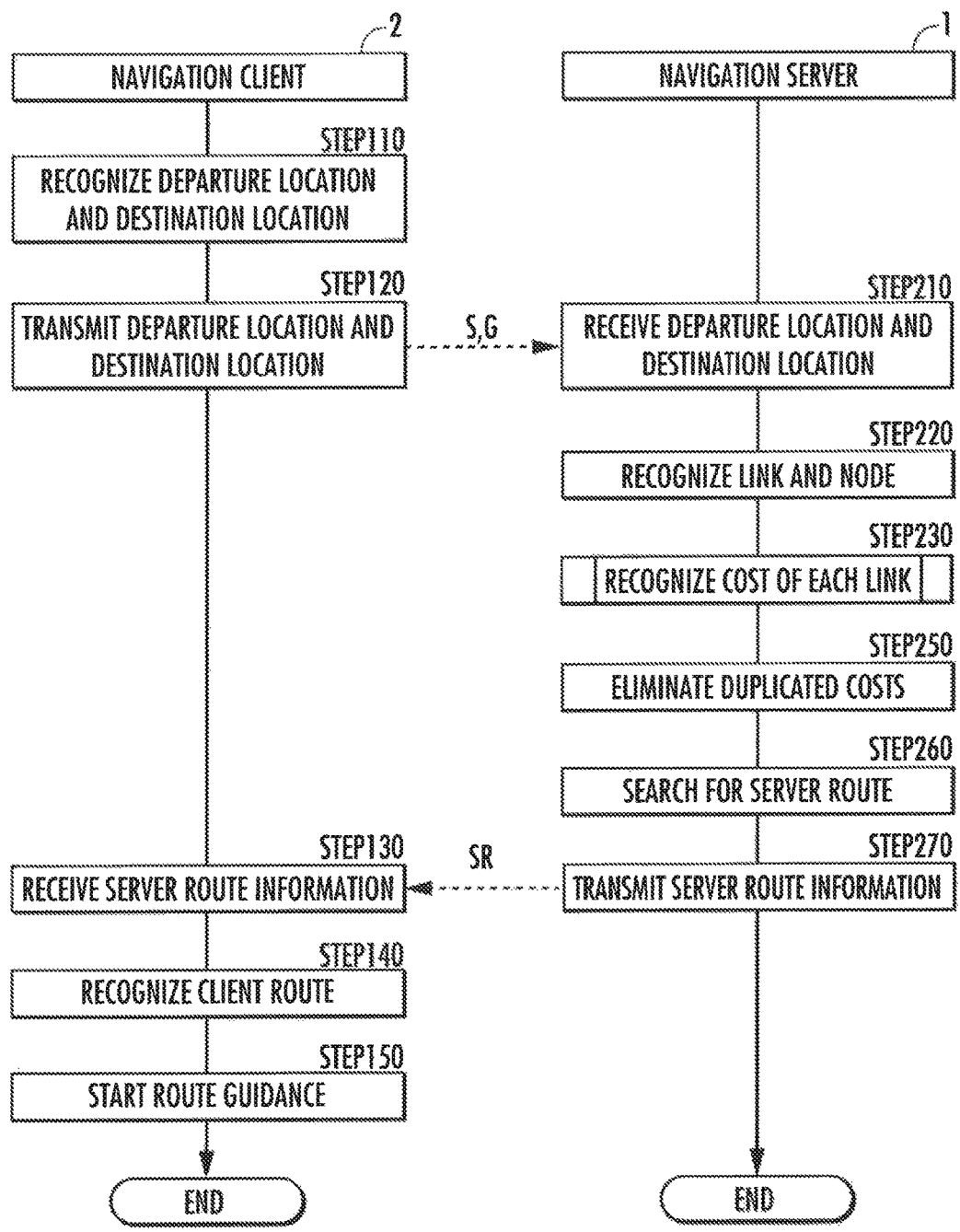

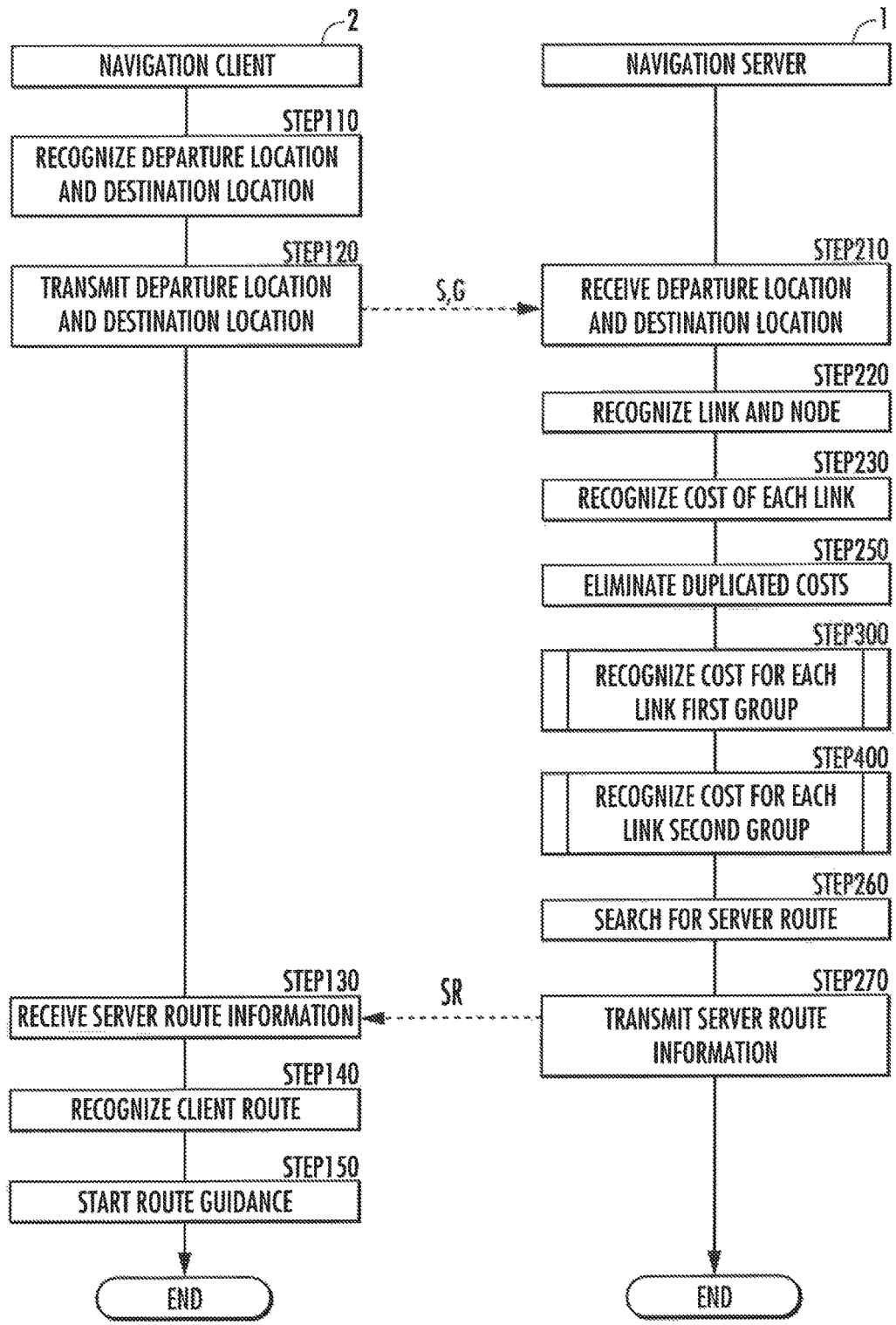

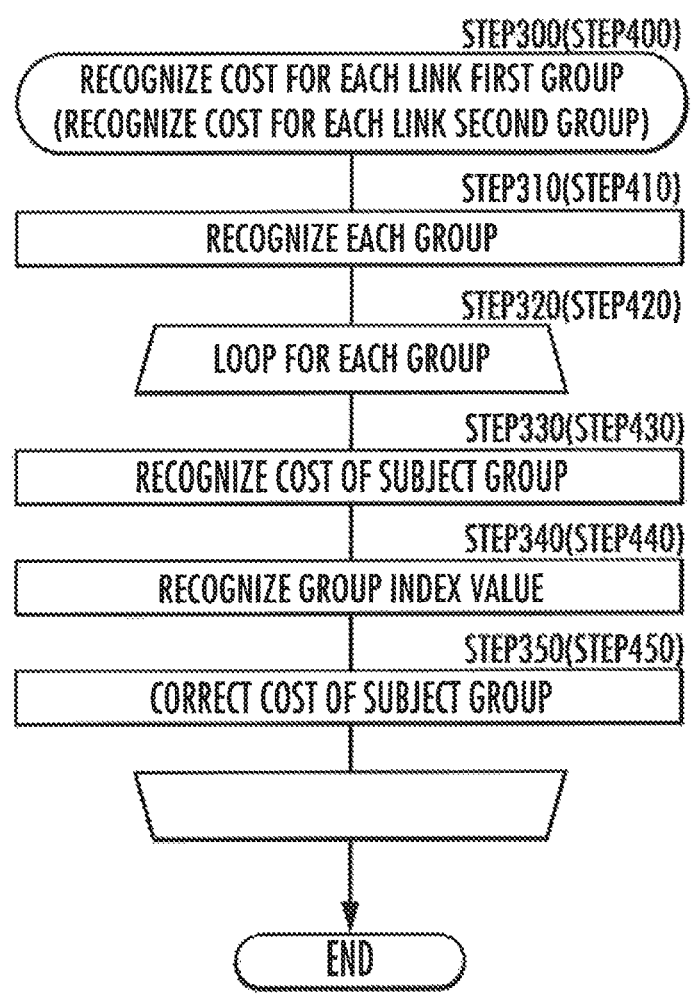

NAVIGATION SERVER, NAVIGATION CLIENT, AND NAVIGATION METHOD

BACKGROUND OF THE INVENTION

Field of the Invention

The present invention relates to a navigation server, a navigation client, and a navigation method.

Description of the Related Art

As a navigation client for making guidance of a route for a mobile object, a route guide device for vehicle has been known, which corrects a link trip time contained in external information such as a map, and corrects or estimates the link trip time with high precision to search for a route that minimizes the trip time with higher precision (e.g., see Japanese Patent Laid-Open No. H7-129893).

A route guide device for vehicle of Japanese Patent Laid-Open No. H7-129893 includes a link equivalent length calculation section that calculates, for a link having right (left) turns or traffic regulations, a suitable link length taking into consideration a trip time increased by influences of the right (left) turns or traffic regulations, and a road type correction section that corrects the trip time in accordance with a road type such as a national road or an ordinary road, and a road width correction section that corrects the trip time based on a road width.

With the route guide device for vehicle of Japanese Patent Laid-Open No. H7-129893, the link trip time contained in external information is corrected, with the properties of the link such as right or left turns, traffic regulations, road types, and road widths taken into consideration, whereby it is possible to search for a route minimizing the trip time with high precision.

However, a user does not always desire a route minimizing a trip time. For example, rather than the route minimizing a trip time, a user may desire a route having a low degree of making a driver feel burdened, even if the route takes somewhat longer.

SUMMARY OF THE INVENTION

In view of such problems, the present invention has an objective to provide a navigation server, a navigation client, and a navigation method that allow for selecting a route estimated to have a low degree of making a user feel burdened.

A navigation server of the present invention includes:

a server storage device that stores server map information in which a road is represented by a link;

a server location recognition element that recognizes, through communications, a departure location and a destination location of a user of a navigation client;

a server cost recognition element that recognizes a reference segment cost in a subject segment, the subject segment being composed of one or a plurality of continuous links included in a server route candidate that is a candidate of a server route connecting a link in a vicinity of the departure location and a link in a vicinity of the destination location;

a server cost correction element that, for at least one of a plurality of indices representing one or both of a road environment of the subject segment and a relative relationship between the subject segment and one or more of other segments included in the server route candidate, evaluates a segment cost index value representing a traffic difficulty of the subject segment, and calculates a correction segment cost by correcting the reference segment cost of the subject segment using the segment cost index value of the subject segment; and a server cost information transmission element that transmits, to the navigation client, information associated with the correction segment cost.

With the navigation server having the configuration, the corrected segment cost is calculated with a traffic difficulty of the subject segment represented by each segment cost index value factored in, and information on this corrected segment cost is transmitted to the navigation client. Consequently, by determining a client route based on the information on this corrected segment cost, it is possible to select appropriately a route that is estimated to have a low degree of making a user feel burdened.

In the navigation server of the present invention, the server cost recognition element is preferably configured to determine, for the subject segment, a linear evaluation value that represents whether a shape of a link included in the subject segment is similar to a linear shape and to determine, based on the linear evaluation value, a segment cost index value of the subject segment so as to evaluate a segment cost of the subject segment to be smaller continuously or stepwise as the shape of the link included in the subject segment is more similar to a linear shape.

With the navigation server having the configuration, the segment cost index value is determined so as to evaluate the segment cost of a subject segment to be smaller continuously or stepwise as a link included in the subject segment is more similar to a linear shape. Then, the segment cost is corrected based on this segment cost index value, and a server route candidate that minimizes this segment cost is selected as a server route.

This makes a route including many segments similar to a linear shape likely to be evaluated to have a relatively small total value of the segment costs of the segments, and thus likely to be selected as a server route.

That is, it is possible to select appropriately a route estimated to have a low degree of making a user feel burdened, so as a route estimated to be similar to a linear shape, as a server route.

In the navigation server of the present invention, the server cost recognition element is preferably configured to evaluate a degree of change in road environment of the subject segment or a degree of change in road environment of the other segments with respect to the subject segment, and to determine the segment cost index value of the subject segment so as to evaluate a segment cost of the subject segment to be higher continuously or stepwise with an increase in the degree of change.

With the navigation server having the configuration, the segment cost index value is determined so as to evaluate the segment cost of the subject segment to be higher continuously or stepwise with an increase of a degree of change in road environment of the subject segment or a degree of change in road environment from of the other segments with respect to the subject segment. Then, the segment cost is corrected based on this segment cost index value, and a server route candidate that minimizes this segment cost is selected as a server route.

This makes a route including a segment having a relatively high degree of change in road environment likely to be evaluated to have a relatively great total value of the segment costs of the segments, and thus likely to be not selected as a server route. On the other hand, a route having a relatively low degree of change in road environment is likely to be evaluated to have a relatively small total value of the segment costs of the segments included in the route, and thus likely to be selected as a server route.

That is, it is possible to select appropriately a route estimated to have a low degree of making a user feel burdened, such as a route having a relatively low degree of change in road environment, as a server route.

In the navigation server of the present invention, the server storage device is preferably configured to store curvature information on a curvature or curvature change amount of a road in each segment, and the server cost recognition element is preferably configured to look up the curvature information to recognize an integrated value of absolute values of curvatures or an integrated value of absolute values of curvature change amounts, of a road in the subject segment, and to determine the segment cost index value of the subject segment in such a manner as to evaluate a segment cost of the subject segment to be higher continuously or stepwise with an increase in the integrated value of the absolute values of the curvatures or the integrated value of the absolute values of the curvature change amounts, of the road in the subject segment.

With the navigation server having the configuration, for a segment having a relatively great integrated value of the absolute values of curvatures or an integrated value of the absolute values of curvature change amounts of roads, the segment cost of the segment is evaluated to be high. Consequently, it is possible to select appropriately a route estimated to have a low degree of making a user feel burdened, such as a route having a relatively low integrated value of the absolute values of curvatures or an integrated value of the absolute values of curvature change amounts of roads, as a server route.

In the navigation server of the present invention, the server storage device is preferably configured to store connection mode information on a connection mode between segments adjacent to each other, and the server cost recognition element is preferably configured to look up the connection mode information to determine a connection mode between the subject segment and another segment adjacent to the subject segment, and to determine a segment cost index value of the subject segment in accordance with the connection mode between the subject segment and the another segment adjacent to the subject segment.

With the navigation server having the configuration, the segment cost index value is determined in accordance with the connection mode between the subject segment and another segment adjacent to the subject segment, and the segment costs of the segments are corrected using the segment cost index value.

It is thereby possible to select appropriately a route including a connection mode that is estimated to have a low degree of making a user feel burdened, as a server route.

In the navigation server of the present invention, the server storage device is preferably configured to store traffic regulation information on a stop instruction or a speed restriction of each segment, and the server cost recognition element is preferably configured to recognize, based on the traffic regulation information, a stop instruction or a speed restriction present in the subject segment, and to determine the segment cost index value in accordance with the stop instruction or the speed restriction in the subject segment.

With the navigation server having the configuration, it is possible to select appropriately a route estimated to have a low degree of making a user feel burdened, such as a route having a relatively few traffic regulations, as a server route.

In the navigation server of the present invention, the server storage device is preferably configured to store width information that represents a width or a number of lanes of each segment, and the server cost recognition element is preferably configured to recognize a type of the width information stored in the server storage device, and to determine a width level of the subject segment based on the type of the width information, and the width or the number of lanes of the subject segment, and determine the segment cost index value of the subject segment based on the width level of the subject segment.

With the navigation server having the configuration, even when the width information stored in the server storage device differs in width and the number of lanes, the width level of the subject segment is determined, and a segment cost index value of the subject segment is determined based on the width level of the subject segment.

Consequently, even if the width information differs due to the difference or the like of a provider of the information, it is possible to select appropriately a route including a road that has a width estimated to have a low degree of making a user feel burdened, as a server route.

In the navigation server of the present invention, the server storage device is preferably configured to store road type information that represents a road type of each segment, including a first class expressway and a second class expressway different from the first class expressway, and the server cost recognition element is preferably configured to recognize the road type of the subject segment based on the road type information, and to determine the segment cost index value of the subject segment in so as to evaluate, when the road type of the subject segment is the first class expressway, a segment cost of the subject segment to be higher than when the road type of the subject segment is the second class expressway.

While a degree of making a user of a mobile object feel burdened varies according to the properties of an expressway, with the navigation server having the configuration, expressways are classified into a plurality of types, and a segment cost index value is determined so as to differ according to the types of the expressways. The segment cost is corrected using the segment cost index value, whereby it is possible to select a server route appropriately, with a traffic difficulty corresponding to the type of the expressway factored in.

In the navigation server of the present invention, the server storage device is preferably configured to store road infrastructure information on a road infrastructure or a structure that is provided being integrated with a road included in each segment or on an appurtenance that accompanies the road, and the server cost recognition element is preferably configured to recognize, based on the road infrastructure information, the road infrastructure or the structure that is provided being integrated with the subject segment or the appurtenance that accompanies the subject segment, and to determine the segment cost index value of the subject segment in accordance with the recognized road infrastructure or the structure.

While a degree of making a user of a mobile object feel burdened varies according to the nature of a road infrastructure, structure, or appurtenance, with the navigation server having the configuration, a segment cost index value is determined in accordance with the road infrastructure, structure, or appurtenance. The segment cost is corrected using the segment cost index value, whereby it is possible to select a server route appropriately, with a traffic difficulty corresponding to the type of the infrastructure, structure, or appurtenance factored in.

BRIEF DESCRIPTION OF THE DRAWINGS

FIG. 1 is a general configuration diagram of a navigation system in a first embodiment;

FIG. 2 is a flowchart of route search processing in the first embodiment;

FIG. 3A, FIG. 3B, and FIG. 3C are diagrams in which FIG. 3A is a diagram illustrating a relationship between nodes and links, FIG. 3B is a diagram illustrating a relationship among nodes, links, and costs after a cost recognition process, and FIG. 3C is a diagram illustrating a relationship among nodes, links, costs, and server routes after a duplicated cost elimination process;

FIG. 8 is a flowchart of route search processing in the third embodiment;

FIG. 9 is a flowchart of a cost recognition process for each link first group (or for each link second group); and FIG. 10A and FIG. 10B are diagrams in which FIG. 10A is a first diagram illustrating link first groups and link second groups, and FIG. 10B is a second diagram illustrating the link first groups and the link second groups.

Figure 3A:
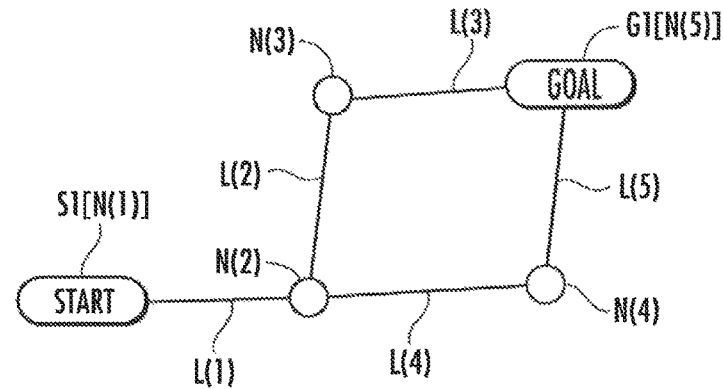

DETAILED DESCRIPTION OF THE PREFERRED EMBODIMENTS (First Embodiment)

A navigation system as a first embodiment of the present invention illustrated in FIG. 1 includes a navigation server 1 and a plurality of navigation clients 2. The navigation server 1 and each of the plurality of navigation clients 2 can communicate with each other over one or more networks. The navigation clients 2 are configured to be mounted temporarily or permanently on mobile objects, including vehicles such as four-wheel vehicles, two-wheeled vehicles, and bicycles, that are apparatuses having a function of moving according to driving operation of users.

(Configuration of Navigation Server)

The navigation server 1 includes a server location recognition element 11, a server cost recognition correction element 12, a server cost information transmission element 13, and a server storage device 16. The server cost recognition correction element 12 corresponds to a server cost recognition element and a server cost correction element of the present invention.

The server location recognition element 11, the server cost recognition correction element 12, and the server cost information transmission element 13 are implemented with a processing unit (CPU), and if necessary, communication equipment, a storage device (memory), and the like, the processing unit reading, if necessary, software and data from a specified region in the memory included in the server storage device 16 and executing specified calculation processing on the data according to the software. The specified calculation processing will be described later in detail.

The server storage device 16 is configured to hold and retain received information and an execution result such as calculation result from each of the server location recognition element 11, the server cost recognition correction element 12, and the server cost information transmission element 13. The server storage device 16 is configured to hold and retain server map information 161, avoidance coefficient setting information 162, road traffic information 163, static cost information 164, connection mode information 165, road type information 166, width information 167, traffic regulation information 168, and road infrastructure information 169.

The server map information 161 contains series of coordinate values ((latitude, longitude) or (latitude, longitude, altitude)) that represents the position, shape, attitude, and the like of each of the links forming roads, as well as link identification information that is used to identify each link, and data that represents an attribute of the each link. Each link is connected to another by a node. The link is an example of a segment of the present invention.

The avoidance coefficient setting information 162 contains an avoidance coefficient that represents a traffic difficulty of a link $L(k)$ or a traffic difficulty from a link $L(k1)$ to a link $L(k2)$ adjacent to each other, for each of a plurality of indices. The avoidance coefficient will be described later in detail.

The road traffic information 163 contains an average link travel time, in each of links $L(k)$, that is obtained based on information successively collected from mobile objects, and a predicted link travel time that is predicted based on the average link travel time, as well as an average transition time that is taken to transition from a given link $L(k1)$ to another link $L(k2)$, and a predicted transition time that is predicted based on the average transition time. Instead of or in addition to them, the road traffic information 163 may contain an average link travel energy consumption amount, on a fuel efficiency or an electric mileage in each link $L(k)$, that is calculated based on information successively collected from mobile objects, and a predicted link travel energy consumption amount that is predicted based on the average link travel energy consumption amount, as well as an average transition energy consumption amount that is taken to transition from a given link $L(k1)$ to another link $L(k2)$, and a predicted transition energy consumption amount that is predicted based on the average transition energy consumption amount.

The static cost information 164 contains a link travel time, in each link $L(k)$, that is determined in advance, and a transition time that is taken to travel from a given link $L(k1)$ to another link $L(k2)$. Instead of or in addition to these, the static cost information 164 may contain a link travel energy consumption amount, in each link $L(k)$, that is determined in advance, as well as a transition energy consumption amount that is taken to transit from a given link $L(k1)$ to another link $L(k2)$. Instead of or in addition to these, the static cost information 164 may contain a distance of a link $L(k)$ or a distance from a link $L(k1)$ to another link $L(k2)$.

The connection mode information 165 contains, as information representing a connection mode between each of nodes $N(j)$ and a link $L(k)$, straight ahead, right turn, left turn, and U-turn, as well as a connection angle between links $L(k1)$ and $L(k2)$ adjacent to each other.

Figure 3B:
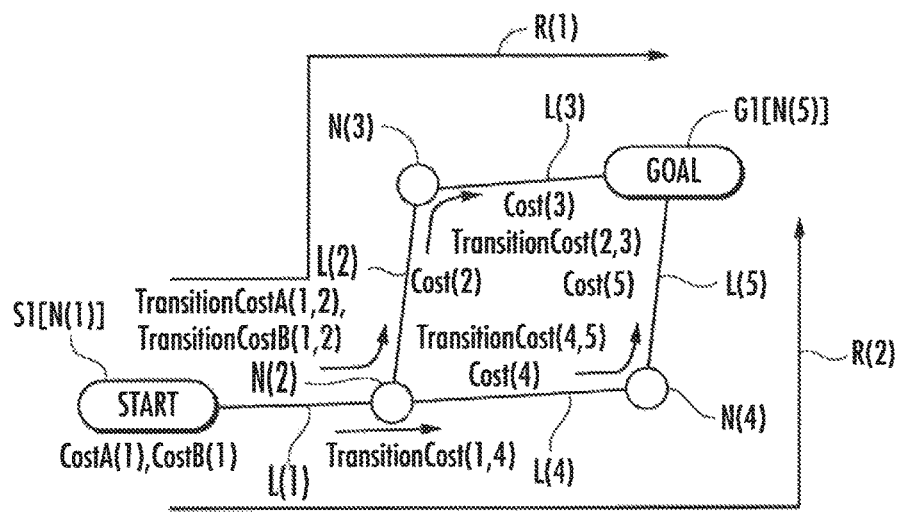
Figure 3C:
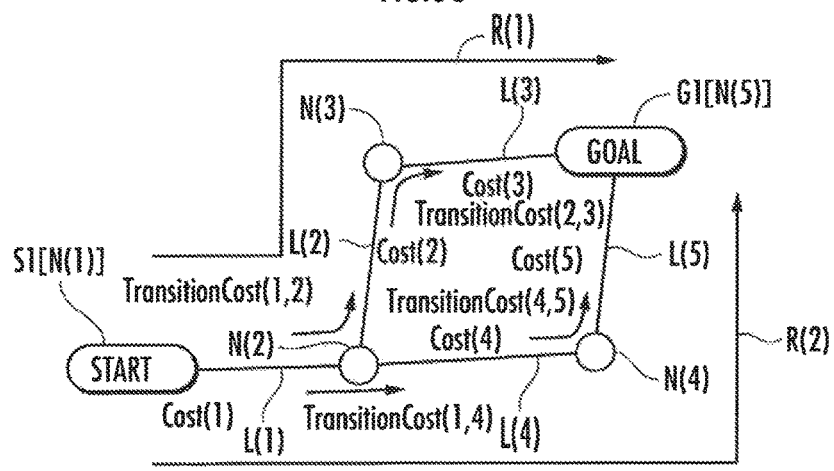

Note that a node $N(j)$ represents each of the locations of intersections or the like on a map, a link $L(k)$ represents a road that connects two nodes, as illustrated in FIG. 3A to FIG. 3C, which illustrate the case of k=1 to 5 and j=1 to 5.

The road type information 166 contains, as information representing a road type of each link L(k), a distinction among an intra-city expressway, an inter-city expressway, and an ordinary road, as well as a distinction between a toll road and a freeway.

The width information 167 contains, as information representing a road width of each node N(j) or each link L(k) directly or indirectly, a road width or the number of lanes.

The traffic regulation information 168 contains, as information representing a traffic regulation of each node N(j) or each link L(k), information on the presence/absence and the number of traffic lights, information on the presence/absence and the number of stop signs, and information on a maximum speed of each link.

The road infrastructure information 169 contains, as information representing a facility or a structure that is integrated with each node N(j) or a road representing each link L(k), or an appurtenance that accompanies the road, information on a tunnel, a bridge, a road fence, or the like.
(Configuration of Navigation Client)

The navigation client 2 is formed by a portable terminal device such as a smartphone or a tablet. The term "portable" means that, for example, the device has a size as large as a normal palm of human and has such a weight that the device can be carried about easily in one hand, a pocket of clothing, or the like. The navigation client 2 may be formed by equipment having a size and a weight larger than those of portable equipment (e.g., equipment assembled to a mobile object).

The navigation client 2 includes a client location recognition element 21, a client route recognition element 23, a client input device 24, a client output device 25, and a client storage device 26.

The client location recognition element 21 and the client route recognition element 23 are implemented with a processing unit (CPU), and if necessary, communication equipment, a storage device (memory), and the like, the processing unit reading, if necessary, software and data from a specified region in the memory included in the client storage device 26 and executing specified calculation processing on the data according to the software.

The client location recognition element 21 is configured to measure the current position of the navigation client 2 successively. The current position of the navigation client 2 is measured based on signals received with a GPS receiver from satellites, and in addition, if necessary, an output signal from a gyro sensor. The client location recognition element 21 is configured to transmit, to the navigation server 1, probe information that represents how the position of the navigation client 2 changes on a time-series basis. The client location recognition element 21 is configured to transmit, to the navigation server 1, "requested information" that contains a departure location and a destination location.

The client route recognition element 23 is configured to receive, from the navigation server 1, "server route information" that corresponds to the "requested information", and to search for a client route based on the server route information using the client map information 261, which will be described later.

The client input device 24 is formed by an operating button and a microphone, enabling various controls or input settings by user's operation or utterance. The client output device 25 is formed by a display device and an audio output device (speaker), displaying image content such as client map information or outputting audio content. The client input device 24 and the client output device 25 may be formed by a touch panel display.

The client storage device 26 is configured to hold and retain received information and an execution result such as a calculation result from the client location recognition element 21 and the client route recognition element 23, respectively. The client storage device 26 is configured to store the client map information 261, contents 262, and the like.

The client map information 261 contains coordinate series that represents the position, shape, attitude, and the like of each of the links forming roads, and link identification information that is used to identify each link.

The client map information 261 may not contain the coordinate series but contain image information that is used to display a map on the client output device 25 and link identification information on each of the links forming the roads included in the map. In this case, a coordinate value that matches a coordinate value contained in probe information or requested information may be specified out of coordinate values contained in server map information by the navigation server 1, and link identification information, a road type, or the like corresponding to the specified coordinate value may be specified.

Even when the definitions or the like of coordinate series differs between the client map information 261 and the server map information 161 because the client map information 261 and the server map information 161 have different specifications and data structures, attaching common link identification information to an identical link makes it possible to perform matching of a link. The navigation server 1 transmits server route information that contains link identification information, and the navigation client 2 displays, via the client output device 25, the image of a navigation route including a plurality of links that are identified with the link identification information contained in the route information.

The content 262 contains image contents (still images and videos) that are contents recognized through the sense of seeing, as well as audio contents (music pieces and operation sounds) that are contents recognized through the sense of hearing and entertainment contents that are made by combining the image contents and the audio contents. The image contents include part of client map information, as well as a client route that is superimposed on the client map information.

Outputting information by a component of the present invention means that the component outputs the information in any manner as to allow a human to recognize the information through the human's five senses including seeing hearing touching and the like by displaying the information, outputting a sound, outputting a vibration, or the like. Configuring a component of the present invention to execute the component's own calculation processing means that the component has a function of reading a required program and required data from a memory and thereafter executing the component's own calculation processing based on the data according to the program, and that the component is programmed as such.
(Route Search Processing)

Referring to FIG. 2, there will be described a schematic flow of route search processing in the present embodiment.

The client location recognition element 21 detects a user's operation on the client input device 24 to recognize a departure location and a destination location specified by the user (FIG. 2/STEP110). The client location recognition element 21 may recognize a current location to be the departure location.

The client location recognition element 21 transmits, to the navigation server 1, a departure location S and a destination location G that it has recognized (FIG. 2/STEP120). The departure location S and the destination location G are expressed in the form of, for example, a coordinate value, or an ID or the like representing a node or a link.

The server location recognition element 11 receives, from the navigation client 2, the departure location S and the destination location G (FIG. 2/STEP210).

The server location recognition element 11 looks up the server map information 161 stored in the server storage device 16 to recognize such links L(k) and nodes N(j) as illustrated in FIG. 3, and recognize a location S1 corresponding to the departure location S and a location G1 corresponding to the destination location G (FIG. 2/STEP220). In FIG. 3, the location S1 is a node N(1), and the location G1 is a node N(5).

The server cost recognition correction element 12 executes a cost recognition process, which will be described later, on each of the links based on the recognized departure location S1 and destination location G1 (FIG. 2/STEP230). In this cost recognition process, as illustrated in FIG. 3B, a travel cost Cost(k) is assigned to each of links L(k) included in each of server route candidates Rm (m=1, 2, ...), which is a route connecting the departure location S1 and the destination location G1, and a transition cost TransitionCost (k1,k2) that is a cost of the movement from a link L(k1) to a link L(k2).

For example, if the road traffic information 163 is updated during the process of FIG. 2/STEP220, a plurality of travel costs CostA(1) and CostB(1) which differ from each other may be assigned to one link L(1), or a plurality of transition costs TransitionCostA(1,2) and TransitionCostB(1,2) which differ from each other may be assigned to one set of link L(1) and link L(2), as illustrated in FIG. 3B.

For this reason, the server cost recognition correction element 12 executes a process of eliminating (deleting) duplicated costs according to predetermined degree of priorities, on the travel costs Cost(k) and the transition costs TransitionCost(k1,k2) (FIG. 2/STEP250). For example, in STEP250, the server cost recognition correction element 12 may eliminate costs not having a maximum cost in each link L(k), costs not having a minimum cost in each link L(k), or costs not having the latest time of assignment in each link L(k), the time of assignment being a time at which the cost is assigned to the link L(k).

On the basis of the travel costs Cost(k) and the transition costs TransitionCostA(k1,k2) assigned by the server cost recognition correction element 12, the server cost information transmission element 13 searches for a server route candidate R(m) that minimizes total sum TotalCost(R(m)) of its costs, as a server route SR, using a shortest route search algorithm such as the Dijkstra's algorithm (FIG. 2/STEP260).

For example, a server route candidate R(1) in FIG. 3C is a course in which a mobile object starts from the location S1, passes through a link L(1), moves from the link L(1) to a link L(2), passes through the link L(2), moves from the link L(2) to a link L(3), and passes through the link L(3) to reach the location G1. Therefore, a total sum TotalCost(R(1)) of the costs of the server route candidate R(1) is expressed by the following formula (1).

[Formula 1]

$$\text{TotalCost}(R(1)) = \text{Cost}(1) + \text{TransitionCost}(1,2) + \text{Cost}(2) + \text{TransitionCost}(2,3) + \text{Cost}(3) \quad (1)$$

For example, a server route candidate R(2) in FIG. 3C is a course in which a mobile object, starts from the location S1, passes through the link L(1), moves from the link L(1) to a link L(4), passes through the link L(4), moves from the link L(4) to a link L(5), and passes through the link L(5) to reach the location G1. Therefore, a total sum TotalCost(R (2)) of the costs of the server route candidate R(2) is expressed by the following formula (2).

[Formula 2]

$$\text{TotalCost}(R(2)) = \text{Cost}(1) + \text{TransitionCost}(1,4) + \text{Cost}(4) + \text{TransitionCost}(4,5) + \text{Cost}(5) \quad (2)$$

The server cost information transmission element 13 transmits, to the navigation client 2, server route information that contains a coordinate value, a node ID, a link ID, and the like to specify the searched server route SR (FIG. 2/STEP270).

The server route information is an example of "information related to a corrected segment cost" of the present invention. Instead of or in addition to this, the server cost information transmission element 13 may transmit, to the navigation client 2, the travel costs and the transition costs, as the "information related to a corrected segment cost".

The client route recognition element 23 receives the server route information (FIG. 2/STEP130).

The client route recognition element 23 looks up the client map information 261 stored in the client storage device 26 based on the coordinate value, the node ID, and the link ID contained in the server route information, to recognize a client route equivalent to the server route SR (FIG. 2/STEP140).

The client route recognition element 23 creates a map including the client route, outputs the map to the client output device 25 together with the content 262 stored in the client storage device 26, and starts guidance (FIG. 2/STEP150).

(Cost Recognition Process)

Figure 4:
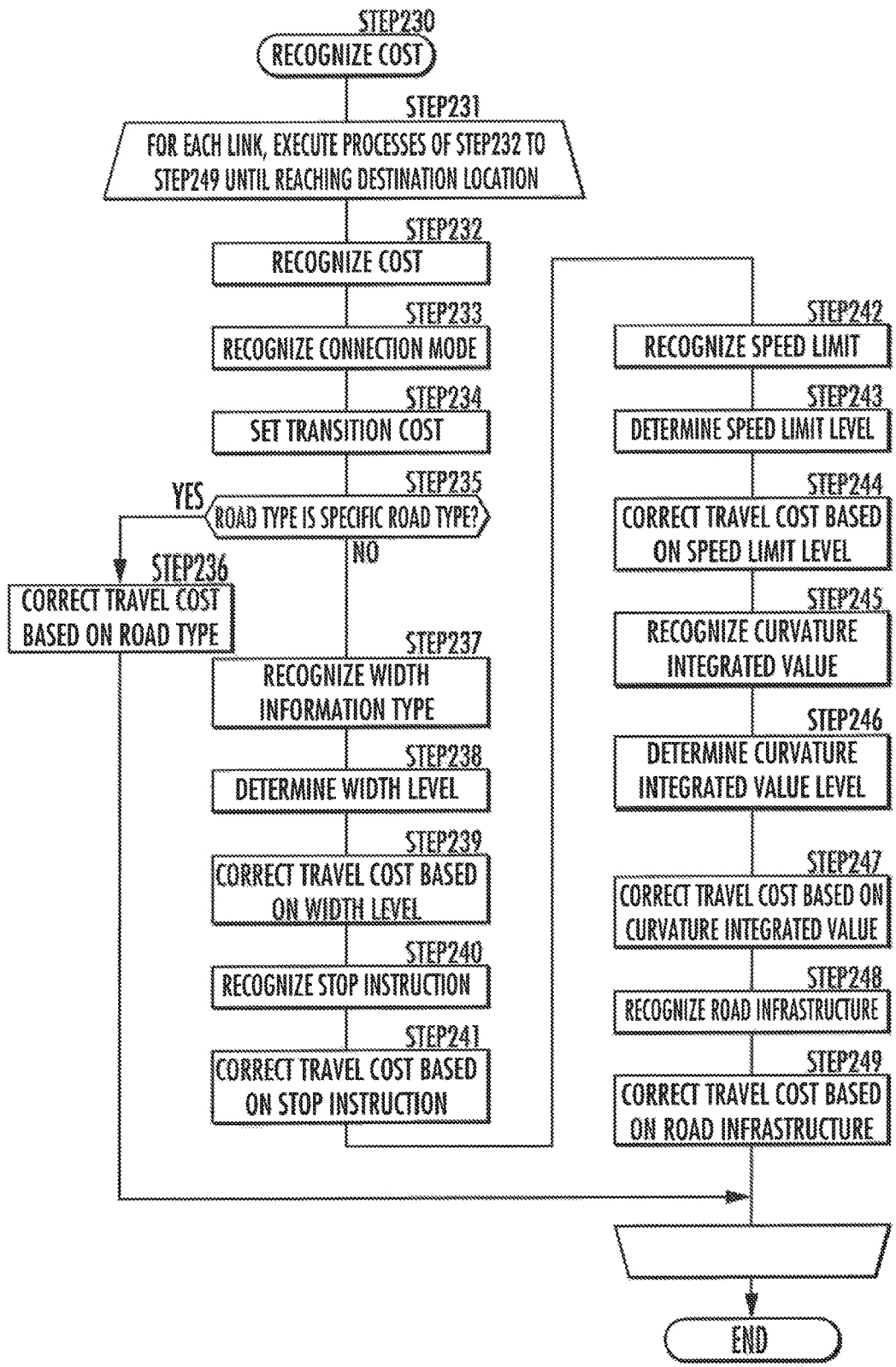
FIG. 4 is a flowchart of the cost recognition process for each link.

Referring to FIG. 4, there will be described in detail a cost recognition process in the present embodiment that is executed on each link by the server cost recognition correction element 12 (STEP230).

The server cost recognition correction element 12 executes the processes of STEP232 to STEP249 on each of adjacent links, starting with the location S1 up to the location G1 (FIG. 4/STEP231).

More specifically, in FIG. 3A, the server cost recognition correction element 12 executes the processes of STEP232 to STEP249 on the link L(1) adjacent to the location S1. Next, the server cost recognition correction element 12 executes the processes of STEP232 to STEP249 on each of the links L(2) and L(4) adjacent to the link L(1). Next, the server cost recognition correction element 12 executes the processes of STEP232 to STEP249 on each of the link L(3) adjacent to the link L(2), and the link L(5) adjacent to the link L(4). Subsequently, the server cost recognition correction element 12 finishes executing the processes because both of the link L(3) and the link L(5) are adjacent to the location G1.

In other words, unless a given link includes the location G1 or is adjacent to the location G1, the server cost recognition correction element 12 executes the processes of STEP232 to STEP249 on a link adjacent to the given link. On the other hand, if a given link includes the location G1 or is adjacent to the location G1, the server cost recognition correction element 12 does not execute the processes of STEP232 to STEP249 on a link adjacent to the given link.

Hereafter, a link L(k) that is a subject of the processes of STEP232 to STEP249 will be referred to as a subject link L(k).

As is clear from the above, in the present embodiment, a subject link L(k) is a link that is included in at least one server route candidate (a link included in a route to be searched for FIG. 2/STEP260). Not every subject link L(k) has to be a link included in any one of server route candidates, but every link included in a server route candidate has to be assigned with a cost in advance and thus has to be a link that is a subject of the processes of STEP232 to STEP249 (subject link L(k)) at any stage.

The server cost recognition correction element 12 looks up the road traffic information 163 or the static cost information 164 stored in the server storage device 16 to recognize a reference travel cost of a subject link L(k) or a reference transition cost from a previous link L(k−1) that is adjacent to the subject link L(k) (hereafter, referred to as a previous link L(k−1)) to the subject link L(k), as a travel cost Cost(k) of the subject link L(k) or a transition cost TransitionCost(k−1,k) from the previous link L(k−1) to the subject link L(k), respectively (FIG. 4/STEP232).

For example, the average link travel time of a subject link L(k) contained in the road traffic information 163, which is considered as a reference cost, is recognized to be the travel cost Cost(k) of the subject link L(k). Instead of this, the predicted link travel time of the subject link L(k) contained in the road traffic information 163 may be recognized to be the travel cost Cost(k), the average link travel energy consumption amount of the subject link L(k) may be recognized to be the travel cost Cost(k), or the predicted link travel energy consumption amount of the subject link L(k) may be recognized to be the travel cost Cost(k).

The server cost recognition correction element 12 recognizes an average transition travel time from the previous link L(k−1) to the subject link L(k), which is considered as the reference transition cost, to be the transition cost TransitionCost(k−1,k). Instead of the average transition travel time, the server cost recognition correction element 12 may recognize a predicted transition travel time from the previous link L(k−1) to the subject link L(k) to be the transition cost TransitionCost(k−1,k), or may recognize an average travel energy consumption amount or a predicted travel energy consumption amount from the previous link L(k−1) to the subject link L(k) to be the transition cost TransitionCost(k−1,k).

If the road traffic information 163 does not contain the average link travel time or the like of the subject link L(k), or if a predetermined period of time has elapsed from the update time of the average link travel time or the like of the subject link L(k) contained in the road traffic information 163, the server cost recognition correction element 12 may look up the static cost information 164 rather than the road traffic information 163, so as to recognize the reference travel cost to be the travel cost Cost(k) of the subject link L(k). In this case, the server cost recognition correction element 12 may recognize the link travel time of the subject link L(k) contained in the static cost information 164, which is considered as the reference cost, to be the travel cost Cost(k) of the subject link L(k), may recognize the link travel energy consumption amount of the subject link L(k) to be the travel cost Cost(k) of the subject link L(k), or may recognize the distance of the subject link L(k) to be the travel cost Cost(k) of the subject link L(k).

If the road traffic information 163 does not contain the average transition travel time or the like from the previous link L(k−1) to the subject link L(k), or if a predetermined period of time has elapsed from the update time of the average transition travel time or the like contained in the road traffic information 163, the server cost recognition correction element 12 may look up the static cost information 164 rather than the road traffic information 163, so as to recognize a transition travel time from the previous link L(k−1) to the subject link L(k) to be the transition cost TransitionCost(k−1,k).

The server cost recognition correction element 12 looks up the connection mode information 165 stored in the server storage device 16 to recognize the connection mode between a subject link L(k) and a previous link L(k−1) that is adjacent to the subject link L(k) (STEP233).

More specifically, the server cost recognition correction element 12 looks up the connection mode information 165 stored in the server storage device 16 to recognize which of straight ahead, right turn, left turn, and U-turn, the connection mode between the subject link L(k) and the link adjacent to the subject link L(k) is equivalent to. For example, when the subject link L(k) is the link L(2) illustrated in FIG. 3A, the server cost recognition correction element 12 looks up the connection mode information 165 stored in the server storage device 16 to recognize the connection mode between the subject link L(2) and the previous link L(1) to be left turn.

The server cost recognition correction element 12 looks up the avoidance coefficient setting information 162 stored in the server storage device 16 to recognize a transition avoidance coefficient Ct that corresponds to the recognized connection mode, and corrects the transition cost TransitionCost(k−1,k) from the previous link L(k−1) to the subject link L(k) using the transition avoidance coefficient Ct (FIG. 4/STEP234).

For example, the server cost recognition correction element 12 looks up a table contained in the avoidance coefficient setting information 162 (see Table 1) to recognize a transition avoidance coefficient Ct2 corresponding to left turn, which is the connection mode between the previous link L(1) and the subject link L(2), and corrects a transition cost TransitionCost(1,2) from the previous link L(1) to the subject link L(2), by the following formula (3).

TABLE 1

| Connection mode | Transition avoidance coefficient Ct |
|---|---|
| Right turn | Ct1 |
| Left turn | Ct2 |
| U-turn | Ct3 |
| Straight ahead | Ct4 |

[Formula 3]

$$\mathrm{TurnCost}(1,2)=\mathrm{Transition\ Cost}(1,2)*Ct2 \quad (3)$$

If the previous link L(k−1) is a road of left-hand traffic, transition avoidance coefficients Ct1, Ct2, Ct3, and Ct4, which correspond to right turn, left turn, U-turn, and straight ahead, respectively, preferably satisfy the following relationship (4).

[Formula 4]

$$Ct3 \geq Ct1 \geq Ct2 \geq 1 \geq Ct4 \quad (4)$$

This is based on the fact that a driver of a mobile object moving on a road of left-hand traffic generally feels that U-turn is the most troublesome, followed by right turn, and left turn, whereas straight ahead is comfortable, or seldom troublesome.

If the previous link L(k−1) is a road of right-hand traffic, the transition avoidance coefficients Ct1, Ct2, Ct3, and Ct4, which correspond to right turn, left turn, U-turn, and straight ahead, respectively, preferably satisfy the following relationship (5). This is based on the same reason as with left-hand traffic.

[Formula 5]

$$Ct3 \geq Ct2 \geq Ct1 \geq 1 \geq Ct4 \quad (5)$$

The server cost recognition correction element 12 looks up the road type information 166 stored in the server storage device 16 to determine whether or not the road type of the subject link L(k) falls into a specific road type (intra-city expressway or inter-city expressway) (FIG. 4/STEP235).

If the determination result is positive (FIG. 4/STEP235 YES), the server cost recognition correction element 12 looks up the avoidance coefficient setting information 162 stored in the server storage device 16 to recognize a road type avoidance coefficient Ce that corresponds to the road type of the subject link L(k), and corrects the travel cost Cost(k) of the subject link L(k) using the road type avoidance coefficient Ce (FIG. 4/STEP236).

For example, the server cost recognition correction element 12 looks up a table contained in the avoidance coefficient setting information 162 (see Table 2) to recognize the road type avoidance coefficient Ce corresponding to the road type of the subject link L(k), and corrects the travel cost Cost(k) of the subject link L(k), by the following formula (6).

TABLE 2

| Road type | Road type avoidance coefficient Ce |
|---|---|
| Intra-city expressway | Ce1 |
| Inter-city expressway | Ce2 |

[Formula 6]

$$Cost(k) = Cost(k) * Ce \quad (6)$$

Now, a road type avoidance coefficient Ce1 corresponding to intra-city expressway is preferably greater than a road type avoidance coefficient Ce2 corresponding to inter-city expressway.

If the determination result in STEP235 is negative (FIG. 4/STEP235 NO), the server cost recognition correction element 12 looks up the width information 167 stored in the server storage device 16 to recognize a width information type of subject link L(k) (the number of lanes or width) (FIG. 4/STEP237).

Based on the width information type of the subject link L(k), the server cost recognition correction element 12 recognizes a width level of the subject link L(k) using a function, table, map, or the like that associates the width information with width level (FIG. 4/STEP238).

For example, if the width information type of the subject link L(k) is width, the server cost recognition correction element 12 recognizes the width level of the subject link L(k) using the function, table, map, or the like that corresponds to the width.

For example, if the width information type of the subject link L(k) is the number of lanes, the server cost recognition correction element 12 recognizes the width level of the subject link L(k) using a function, table, map, or the like that corresponds to the number of lanes. Instead of this configuration, if the width information type of the subject link L(k) is the number of lanes, the server cost recognition correction element 12 may convert the number of lanes into a width using a predetermined calculation formula and recognize the width level of the subject link L(k) using the function, table, map, or the like that corresponds to the width.

The server cost recognition correction element 12 looks up the avoidance coefficient setting information 162 stored in the server storage device 16 to recognize a width level avoidance coefficient Cw (>0) that corresponds to the width level of the subject link L(k), and corrects the travel cost Cost(k) of the subject link L(k) using the width level avoidance coefficient Cw (FIG. 4/STEP239).

For example, the server cost recognition correction element 12 looks up a table contained in the avoidance coefficient setting information 162 (see Table 3) to recognize the width level avoidance coefficient Cw corresponding to the width level of the subject link L(k), and corrects the travel cost Cost(k) of the subject link L(k), by the following formula (7).

TABLE 3

| Width level | Width level avoidance coefficient Cw |
|---|---|
| Width level 1 | Cw1 |
| Width level 2 | Cw2 |
| . . . | . . . |
| Width level N | CwN |

[Formula 7]

$$Cost(k) = Cost(k) * Cw \quad (7)$$

Instead of or in addition to this, the server cost recognition correction element 12 may add a predetermined value (including a minus value) that corresponds to the width level of the subject link L(k), to the travel cost Cost(k) of the subject link L(k).

For a width level of a larger width of the subject link L(k), it is preferable to set a smaller value to the width level avoidance coefficient Cw corresponding to the width level of the subject link L(k) or the predetermined value corresponding to the width level, stepwise or continuously.

The server cost recognition correction element 12 looks up the traffic regulation information 168 stored in the server storage device 16 to recognize the presence/absence (or the number) of stop instructions included in the subject link L(k) (FIG. 4/STEP240). Specifically, the server cost recognition correction element 12 recognizes the presence/absence (or the number) of traffic lights or the presence/absence (or the number) of stop signs included in the subject link L(k).

The server cost recognition correction element 12 looks up the avoidance coefficient setting information 162 stored in the server storage device 16 to recognize a stop avoidance coefficient Cs that corresponds to the presence/absence (or the number) of traffic lights or the presence/absence (or the number) of stop signs, and corrects the travel cost Cost(k) of the subject link L(k) using the stop avoidance coefficient Cs (FIG. 4/STEP241).

For example, the server cost recognition correction element 12 looks up a table contained in the avoidance coefficient setting information 162 (see Table 4) to recognize the stop avoidance coefficient Cs corresponding to the presence/absence (or the number) of traffic lights or the presence/absence (or the number) of stop signs, and corrects the travel cost Cost(k) of the subject link L(k), by the following formula (8).

TABLE 4

| Stop instruction | Stop avoidance coefficient Cs |
| --- | --- |
| Presence of Traffic lights | Cs1 |
| Presence of Stop sign | Cs2 |

[Formula 8]

$$\text{Cost}(k) = \text{Cost}(k) * Cs \quad (8)$$

Instead of or in addition to this, the server cost recognition correction element 12 may add a predetermined value (including a minus value) that corresponds to the presence/absence (or the number) of traffic lights or the presence/absence (or the number) of stop signs included in the subject link L(k), to the travel cost Cost(k) of the subject link L(k).

It is preferable that the stop avoidance coefficient Cs1 (>1) and the predetermined value (>0) in the case of the presence of a traffic light in the subject link L(k) are greater than the stop avoidance coefficient Cs2 (>1) and the predetermined value (>0) in the case of the presence of a stop sign in the subject link L(k), respectively.

The server cost recognition correction element 12 looks up the traffic regulation information 168 stored in the server storage device 16 to recognize a speed limit of the subject link L(k) (maximum speed limit) (FIG. 4/STEP242).

The server cost recognition correction element 12 determines which of discrete speed limit levels, a speed limit of the subject link L(k) belongs to (FIG. 4/STEP243).

The server cost recognition correction element 12 looks up the avoidance coefficient setting information 162 stored in the server storage device 16 to recognize a speed restriction avoidance coefficient Cl that corresponds to the speed limit level, and corrects the travel cost Cost(k) of the subject link L(k) using the speed restriction avoidance coefficient Cl (FIG. 4/STEP244).

For example, the server cost recognition correction element 12 looks up a table contained in the avoidance coefficient setting information 162 (see Table 5) to recognize the speed restriction avoidance coefficient Cl corresponding to the speed limit level, and corrects the travel cost Cost(k) of the subject link L(k), by the following formula (9).

TABLE 5

| Speed limit level | Speed restriction avoidance coefficient Cl |
| --- | --- |
| Speed limit level 1 | Cl1 |
| Speed limit level 2 | Cl2 |
| ... | ... |
| Speed limit level N | ClN |

[Formula 9]

$$\text{Cost}(k) = \text{Cost}(k) * Cl \quad (9)$$

Instead of or in addition to this, the server cost recognition correction element 12 may add a predetermined value (including a minus value) corresponding to the speed limit level of the subject link L(k), to the travel cost Cost(k) of the subject link L(k).

As a speed limit of the subject link L(k) is at a higher speed limit level, it is preferable to set a smaller value to the speed restriction avoidance coefficient Cl, stepwise or continuously.

The server cost recognition correction element 12 looks up the server map information 161 stored in the server storage device 16 to recognize a curvature integrated value, which is an integrated value of absolute values of curvatures in the subject link L(k) (FIG. 4/STEP245).

The server cost recognition correction element 12 determines which of discrete curvature integrated value levels, the curvature integrated value of the subject link L(k) belongs to (FIG. 4/STEP246). The curvature integrated value level is an example of a "linear evaluation value" of the present invention.

The server cost recognition correction element 12 looks up the avoidance coefficient setting information 162 stored in the server storage device 16 to recognize a curvature integrated value avoidance coefficient Cc that corresponds to the curvature integrated value level, and corrects the travel cost Cost(k) of the subject link L(k) using the curvature integrated value avoidance coefficient Cc (FIG. 4/STEP247).

For example, the server cost recognition correction element 12 looks up a table contained in the avoidance coefficient setting information 162 (see Table 6) to recognize the curvature integrated value avoidance coefficient Cc corresponding to the curvature integrated value level, and corrects the travel cost Cost(k) of the subject link L(k), by the following formula (10).

TABLE 6

| Curvature integrated value level | Curvature integrated value avoidance coefficient Cc |
| --- | --- |
| Curvature integrated value level 1 | Cc1 |
| Curvature integrated value level 2 | Cc2 |
| ... | ... |
| Curvature integrated value level N | CcN |

[Formula 10]

$$\text{Cost}(k) = \text{Cost}(k) * Cc \quad (10)$$

Instead of or in addition to this, the server cost recognition correction element 12 may add a predetermined value (including a minus value) corresponding to the curvature integrated value level of the subject link L(k), to the travel cost Cost(k) of the subject link L(k).

As a curvature integrated value of the subject link L(k) is at a higher curvature integrated value level, it is preferable to increase the curvature integrated value avoidance coefficient Cc, stepwise or continuously.

As the curvature integrated value of the subject link L(k) is at a lower curvature integrated value level, the subject link L(k) is estimated to be more similar to a straight line.

The server cost recognition correction element 12 looks up the road infrastructure information 169 stored in the server storage device 16 to recognize a road infrastructure, structure, or the like that is integrated with the subject link L(k) (e.g., bridge, tunnel) (FIG. 4/STEP248).

The server cost recognition correction element 12 looks up the avoidance coefficient setting information 162 stored in the server storage device 16 to recognize a road infrastructure avoidance coefficient Cf (>1) that corresponds to the road infrastructure, structure, or the like, and corrects the travel cost Cost(k) of the subject link L(k) using the road infrastructure avoidance coefficient Cf (FIG. 4/STEP249).

For example, the server cost recognition correction element 12 looks up a table contained in the avoidance coefficient setting information 162 (see Table 7) to recognize the road infrastructure avoidance coefficient Cf corresponding to the road infrastructure, structure, or the like, and corrects the travel cost Cost(k) of the subject link L(k), by the following formula (11).

TABLE 7

| Road infrastructure, Structure, etc. | Road infrastructure avoidance coefficient Cf |
|---|---|
| Bridge | Cf1 |
| Tunnel | Cf2 |
| ... | ... |

[Formula 11]

$$\text{Cost}(k) = \text{Cost}(k) * Cf \quad (11)$$

Instead of or in addition to this, the server cost recognition correction element 12 may add a predetermined value (>0) that corresponds to the road infrastructure, structure, or the like of the subject link L(k), to the travel cost Cost(k) of the subject link L(k).

(Effect)

With the navigation server 1 having the configuration, traffic difficulties of the subject link L(k) that are represented in the form of respective link cost index values (the transition avoidance coefficient Ct, road type avoidance coefficient Ce, width level avoidance coefficient Cw, stop avoidance coefficient Cs, speed restriction avoidance coefficient Cl, curvature integrated value avoidance coefficient Cc, and road infrastructure avoidance coefficient CO is factored into a link cost Cost(k) (FIG. 4/STEP234, FIG. 4/STEP236, FIG. 4/STEP239, FIG. 4/STEP241, FIG. 4/STEP244, FIG. 4/STEP247, FIG. 4/STEP249), and the server route candidates R(1) and R(2) that minimizes this link cost Cost(k) are selected (searched for) as server routes SR (FIG. 2/STEP260). Therefore, it is possible to search appropriately for a route that is estimated to have a low degree of making a user feel burdened, as a server route SR.

With the navigation server 1 having the configuration, when a link L (k) has a relatively large integrated value of curvatures of roads, the link cost Cost(k) of the link L (k) is evaluated to be high (FIG. 4/STEP246). Consequently, it is possible to search appropriately for a route estimated to have a low degree of making a user feel burdened, which is a route having a relatively small integrated value of curvatures of roads, as a server route (FIG. 2/STEP260).

With the navigation server 1 having the configuration, a link cost index value (the transition avoidance coefficient Ct) is recognized in accordance with the connection mode (right turn, left turn, U-turn, or straight ahead) between the subject link L(k) and another link L(k−1) adjacent to the subject link L(k), and the link cost Cost(k) of the subject link L(k) is corrected (set) using the link cost index value (transition avoidance coefficient Ct) (FIG. 4/STEP233 to STEP234).

It is thereby possible to search appropriately for a route including a connection mode (right turn, left turn, U-turn, or straight ahead) that is estimated to have a low degree of making a user feel burdened, as a server route SR (FIG. 2/STEP260).

With the navigation server 1 having the configuration, it is possible to search appropriately for a route estimated to have a low degree of making a user feel burdened, which is a route having a relatively few traffic regulations (stop instructions or speed restrictions), as a server route (FIG. 4/STEP240 to STEP244, FIG. 2/STEP260).

With the navigation server 1 having the configuration, even when there are different types, width and the number of lanes, of the width information 167 stored in the server storage device 16 the width level of the subject link L(k) is determined, and a link cost index value of the subject link L(k) (the width level avoidance coefficient Cw) is determined based on the width level of the subject link L(k) (FIG. 4/STEP237 to STEP239).

Consequently, even if the width information 167 differs due to the difference or the like of a provider of the information, it is possible to search appropriately for a route including a road that has a width estimated to have a low degree of making a user feel burdened, as a server route SR (FIG. 2/STEP260).

While a degree of making a user of a mobile object feel burdened varies according to the properties of an expressway, with the navigation server 1 having the configuration, expressways are classified into a plurality of types (intra-city expressway and inter-city expressway), and a link cost index value (the road type avoidance coefficient Ce) is determined so as to differ according to the types of the expressways (FIG. 4/STEP236). The link cost Cost(k) of the subject link L(k) is corrected using with this link cost index value (road type avoidance coefficient Ce), whereby it is possible to search appropriately for a server route SR, with a traffic difficulty corresponding to the road type avoidance coefficient Ce of an expressway being considered (FIG. 2/STEP260).

While a degree of making a user of a mobile object feel burdened varies according to the nature of a road infrastructure, structure, or appurtenance, with the navigation server 1 having the configuration, a link cost index value (the road infrastructure avoidance coefficient CO is determined in accordance with a road infrastructure, structure, or appurtenance (FIG. 4/STEP248 to STEP249). The link cost is corrected using the link cost index value (FIG. 4/STEP249), whereby it is possible to search appropriately for a server route, with a traffic difficulty corresponding to the type of the road infrastructure, structure, or appurtenance being considered (FIG. 4/STEP260).

(Modified Embodiment)

In FIG. 4/STEP245 to STEP247, the server cost recognition correction element 12 may use the integrated value of the absolute values of curvature change amounts in a link, rather than the integrated value of the absolute values of curvatures.

The server cost recognition correction element 12 may skip part of the processes of FIG. 4/STEP233 to STEP249.

The server cost recognition correction element 12 may evaluate the link cost of a subject link to be higher continuously or stepwise for a higher degree of change in road environment from a subject link L(k) to another link.

More specifically, for example, the server cost recognition correction element 12 may recognize, in a digitized form, a difference between a road traffic situation, road shape including a curvature change amount, road type, road width, traffic regulation including speed restriction and stop instruction, road infrastructure, structure, appurtenance, and the like of the subject link L(k) as the road environment of a subject link L(k), and a road traffic situation, road shape, road type, road width, traffic regulation, road infrastructure, structure, appurtenance, and the like of another link as the road environment of the other link, and may determine a link cost index value (e.g., avoidance coefficient) in such a manner that the link cost of the subject link is evaluated to be higher continuously or stepwise with an increase in the digitized value. For example, in the case where a road traffic situation is represented by an average speed, when the average speed of the subject link L(k) is 20 km/h, and the average speed of another link is 40 km/h, for example, the absolute value of a difference between these average speeds can be determined as the link cost index value.

With the navigation server 1 having the configuration, a link cost index value is determined in such a manner that the link cost Cost(k) of a subject link L(k) is evaluated to be higher continuously or stepwise as a degree of change in road environment of another link with respect to the subject link L(k) is higher. The link cost is then corrected based on the link cost index value, and a server route candidate R(m) that minimizes the link cost is searched for as a server route SR.

With this configuration, for a route R(m) including a link having a relatively high degree of change in road environment of another link from a subject link L(k), a total value TotalCost(m) of link costs Cost(k) of links is likely to be evaluated to be relatively high. Therefore, such a route R(m) is less likely searched for as a server route SR. On the other hand, for a route R(m) including a link having a relatively low degree of change in road environment of another link from a subject link L(k), a total value TotalCost(m) of link costs Cost(k) of the links included in the route R(m) is likely to be evaluated to be relatively small. Therefore, such a route R(m) is likely to be searched for as a server route SR.

That is, it is possible to search appropriately for a route R(m) estimated to have a low degree of making a user feel burdened, which is a route R(m) having a relatively low degree of change in road environment, as a server route SR.

(Second Embodiment)

Figure 5:
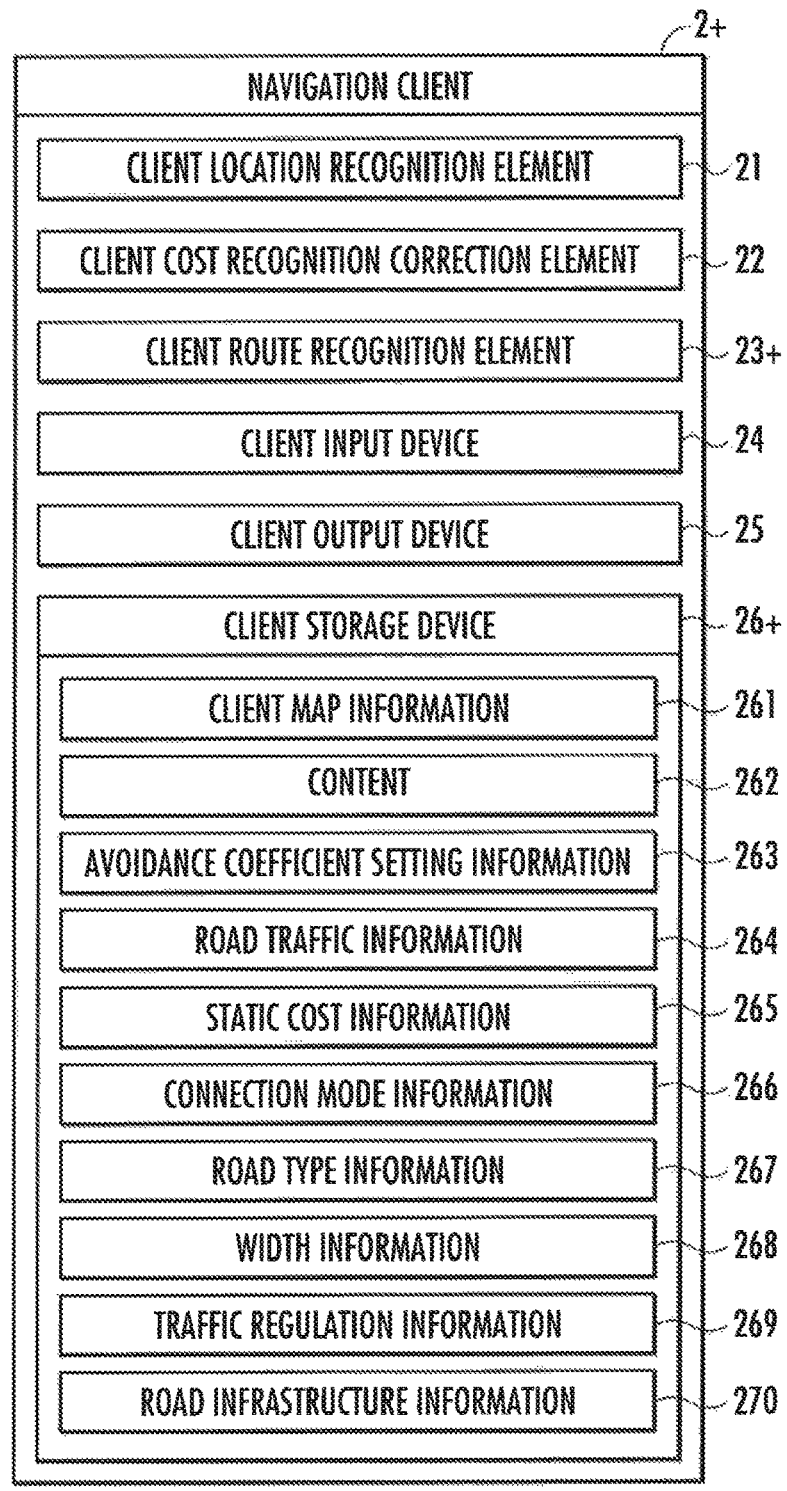
FIG. 5 is a configuration diagram of a navigation client in a second embodiment.

A navigation system illustrated in FIG. 5 as a second embodiment of the present invention includes a navigation client 2+. The navigation client 2+ has the same configuration as that of the navigation client 2 in the first embodiment, except for points to be described below.

The navigation client 2+ includes the client location recognition element 21, a client cost recognition correction element 22, a client route recognition element 23+, the client input device 24, the client output device 25, and a client storage device 26+. Of these, the client location recognition element 21, the client input device 24, and the client output device 25 have the same configurations as those of the client location recognition element 21, the client input device 24, and the client output device 25 in the first embodiment, respectively.

The client cost recognition correction element 22 and the client route recognition element 23+ are implemented with a processing unit (CPU), and if necessary, communication equipment, a storage device (memory), and the like, the processing unit reading, if necessary, software and data from a specified region in the memory included in the client storage device 26+ and executing specified calculation processing on the data according to the software.

Figure 6:
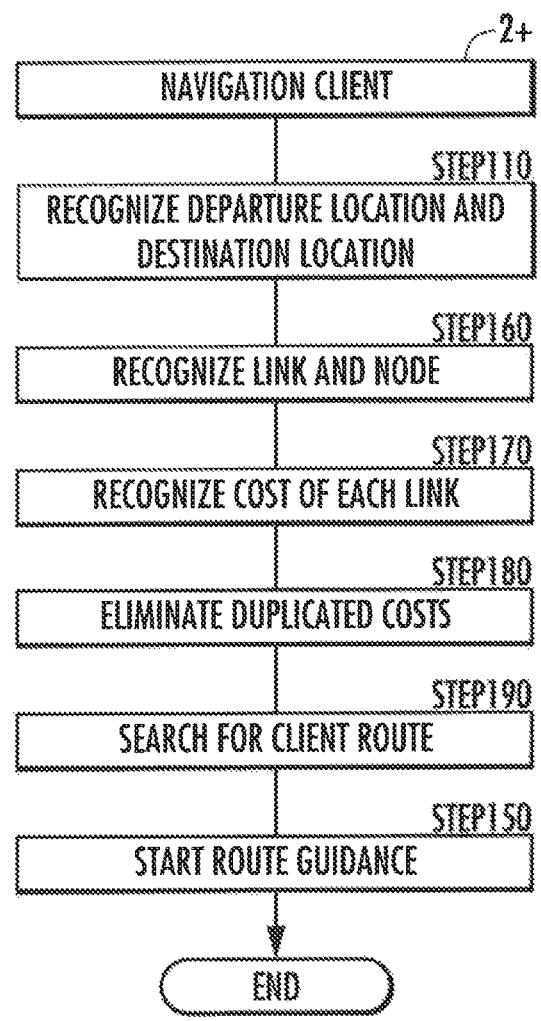
FIG. 6 is a flowchart of route search processing in the second embodiment.

The client cost recognition correction element 22 is configured to execute STEP160 to STEP180 illustrated in FIG. 6 based on a departure location and a destination location. Each of STEP160 to STEP180 is the same process as that of STEP220 to STEP250 in the first embodiment.

The client route recognition element 23+ is configured to, in STEP190, search for a client route based on an execution result from the client cost recognition correction element 22 using the client map information 261. STEP190 is the same process as that of STEP260 in the first embodiment.

The client storage device 26+ stores the client map information 261 and the content 262, as well as avoidance coefficient setting information 263, road traffic information 264, static cost information 265, connection mode information 266, road type information 267, width information 268, traffic regulation information 269, and road infrastructure information 270.

The avoidance coefficient setting information 263, road traffic information 264, the static cost information 265, the connection mode information 266, the road type information 267, the width information 268, the traffic regulation information 269, and the road infrastructure information 270 are the same as the avoidance coefficient setting information 162, the road traffic information 163, the static cost information 164, the connection mode information 165, the road type information 166, the width information 167, the traffic regulation information 168, and the road infrastructure information 169 in the first embodiment, respectively.

(Third Embodiment)

Figure 7:
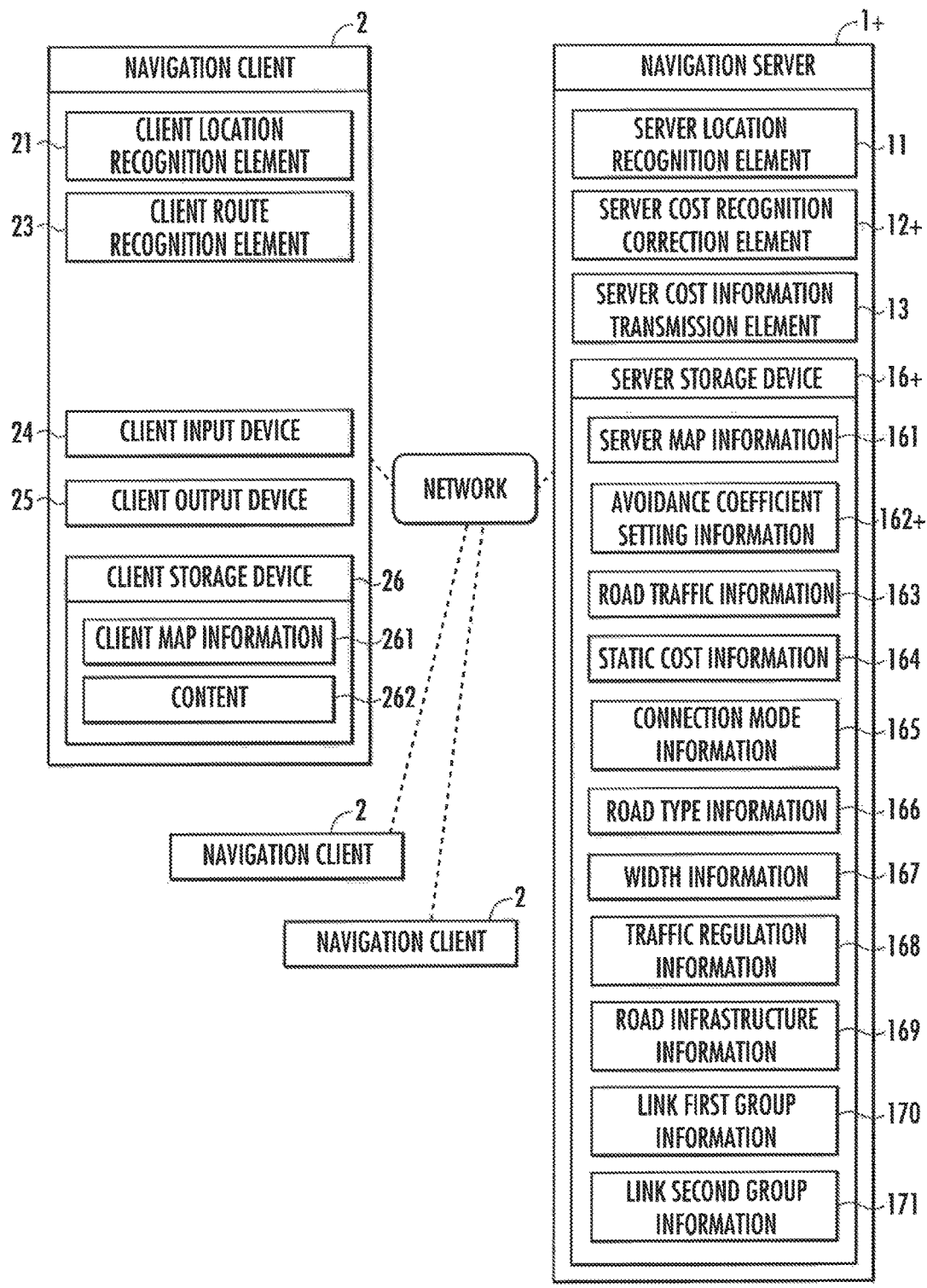
FIG. 7 is a configuration diagram of a navigation system in a third embodiment.

A navigation system illustrated in FIG. 7 as a third embodiment of the present invention includes a navigation server 1+ and the navigation client 2. The navigation server 1+ has the same configuration as that of the navigation server 1 in the first embodiment, except for points to be described below. The navigation client 2 has the same configuration as that of the navigation client 2 in the first embodiment.

The navigation server 1+ includes the server location recognition element 11, a server cost recognition correction element 12+, the server cost information transmission element 13, and a server storage device 16+. Of these, the server location recognition element 11 and the server cost information transmission element 13 have the same configurations as those of the server location recognition element 11 and the server cost information transmission element 13 in the first embodiment.

The server cost recognition correction element 12+ is implemented with a processing unit (CPU), and if necessary, communication equipment, a storage device (memory), and the like, the processing unit reading, if necessary, software and data from a specified region in the memory included in the server storage device 16+ and executing specified calculation processing on the data according to the software. The specified calculation processing will be described later in detail.

The server storage device 16+ is configured to, as with the server storage device 16 in the first embodiment, hold and retain received information and execution results such as calculation results from the server location recognition element 11, the server cost recognition correction element 12+, and the server cost information transmission element 13. The server storage device 16+ is configured to hold and retain the server map information 161, the road traffic information 163, the static cost information 164, the connection mode information 165, the road type information 166, the width information 167, the traffic regulation information 168, and the road infrastructure information 169, as well as avoidance coefficient setting information 162+, link first group information 170, and link second group information 171. The server map information 161, the road traffic information 163, the static cost information 164, the connection mode information 165, the road type information 166, the width information 167, the traffic regulation information 168, and the road infrastructure information 169 are the same as the server map information 161, the road traffic information 163, the static cost information 164, the connection mode information 165, the road type information 166, the width information 167, the traffic regulation information 168, and the road infrastructure information 169 in the first embodiment, respectively.

The avoidance coefficient setting information 162+ contains, in addition to the avoidance coefficient that represents a traffic difficulty of a link L(k) or the avoidance coefficient that represents a traffic difficulty from a link L(k1) to a link L(k2) adjacent to each other, an avoidance coefficient that represents a traffic difficulty of a link first group LFG(v), which will be described later, and an avoidance coefficient that represents a traffic difficulty from a link first group LFG(v1) to a link first group LFG(v2) adjacent to each other, as well as an avoidance coefficient that represents a traffic difficulty of a link second group LSG(w), which will be described later, and an avoidance coefficient that represents traffic difficulty from a link second group LSG(w1) to a link second group LSG(w2) adjacent to each other, for each of a plurality of indices.

Each of the link first group LFG(v) and the link second group LSG(w) is an example of a segment of the present invention.

Figure 10A:
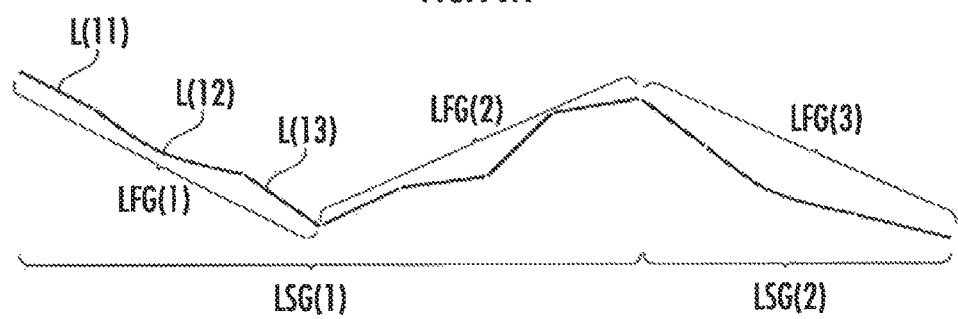
Figure 10B:
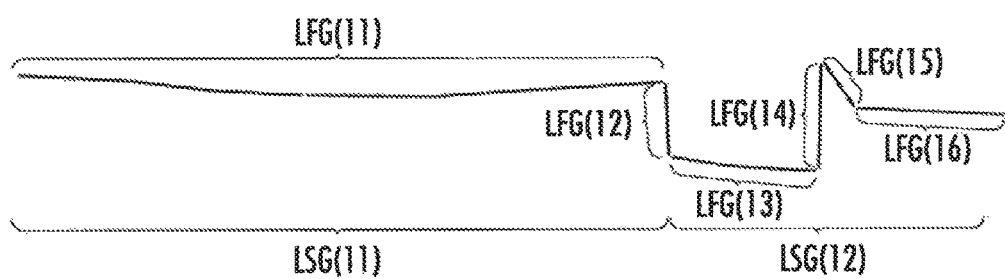

The link first group information 170 contains information on a link first group LFG(v), as illustrated in FIG. 10A and FIG. 10B, which illustrate the case of v=1 to 3 and 11 to 16. The link first group LFG(v) is a link group consisting of one or more links L(k) of which links adjacent to each other form a connection angle within a predetermined angle.

The link second group information 171 contains information on a link second group LSG(w), as illustrated in FIG. 10A and FIG. 10B, which illustrate the case of w=1 to 2 and 11 to 12. The link second group LSG(w) is a link group consisting of one or more link first groups LFG(v). The total length of the link first groups LFG(v) included in one link second group LSG(w) is a predetermined first distance or more and less than a predetermined second distance. Since a link first group LFG(v) being a member of a link second group LSG(w), includes one or more links L(k) as members, a link second group LSG(w) can also be identified with a group including one or more links L(k) as members.

(Route Search Process)

Referring to FIG. 8, a schematic flow of route search processing in the present embodiment will be described.

For the route search processing in the present embodiment, only processes different from the route search processing in the first embodiment will be described, and the same processes as those of the route search processing in the first embodiment will not be described.

After the duplicated cost elimination process (STEP250), the server cost recognition correction element 12+ executes a cost recognition process for each of link first groups using the costs recognized in the cost recognition process (STEP230) for each link (STEP300). The details will be described later.

Subsequently, the server cost recognition correction element 12+ executes a cost recognition process for each of link second groups using the costs recognized in the cost recognition process (STEP300) for each link first group (STEP400). The details will be described later.

The server cost recognition correction element 12+ executes the server route search process (STEP260) using the costs recognized in the cost recognition process for each of the link second groups.

The other processes are the same as those of the route search processing in the first embodiment.

(Cost Recognition Process for Each Link First Group)

Now, referring FIG. 9, the cost recognition process for each link first group (STEP300) will be described.

The server cost recognition correction element 12+ looks up the link first group information 170 to recognize each of the link first groups (STEP310). Through this step, for example, link first groups LFG(v) are recognized, which are illustrated in FIG. 10A and FIG. 10B illustrating the case of v=1 to 3 and v=11 to 16.

The server cost recognition correction element 12+ executes STEP330 to STEP350 in a loop for each link first group LFG(v) (STEP320).

The server cost recognition correction element 12+ recognizes, as a cost FGCost(v) of a subject link first group LFG(v), a total sum of travel costs Cost(k) of the links L(k) included in the subject link first group LFG(v) and transition costs TransitionCost(k1,k2) between links L(k1) and links L(k2) adjacent to each other included in the subject link first group LFG(v), by the following formula (12) (STEP330).

[Formula 12]

$$FGCost(v)=\Sigma Cost(k)+\Sigma TransitionCost(k1,k2) \quad (12)$$

The server cost recognition correction element 12+ recognizes a group index value FGV(v) of a subject link first group LFG(v) (STEP340).

For example, the server cost recognition correction element 12+ looks up the server map information 161 to recognize curvatures of links L(k), and recognizes, as the group index value FGV(v) (≥0), a value obtained by dividing an average value per link of the absolute values of the curvatures of the links L(k) in a subject link first group LFG(v) by a predetermined value (a typical average value of curvature of one link). The curvature of each link L(k) is an example of a "linear evaluation value" of the present invention.

Alternatively, for example, the server cost recognition correction element 12+ may look up the connection mode information 165 to recognize connection angles between links L(k1) and L(k2) adjacent to each other, and recognize, as the group index value FGV(v) (>0), a value obtained by dividing the average value of the absolute values per link of the connection angles between the links L(k1) and L(k2) in the subject link first group LFG(v) by a predetermined value (a typical average value of connection angles). The average value per link of the absolute values of the connection angles between the link L(k1) and L(k2) in the subject link first group LFG(v) is an example of the linear evaluation value of the present invention.

The smaller the group index value, a route formed by the links included in the subject link first group LFG(v) is estimated to be more similar to a linear shape.

Based on the group index value FGV(v) of the subject link first group LFG(v), the server cost recognition correction element 12+ corrects the cost FGCost(v) of the subject link first group LFG(v) in such a manner as to make the cost FGCost(v) of the subject link first group LFG(v) small stepwise or continuously with an decrease in the group index value FGV(v) (STEP350).

For example, the server cost recognition correction element 12+ corrects the cost FGCost(v) of the subject link first group LFG(v), by the following formula (13) (STEP350).

[Formula 13]

$$FGCost(v)=FGCost(v)*FGV(v) \quad (13)$$

After the process of STEP350, the server cost recognition correction element 12+ executes the next loop process.

(Effect of Executing Cost Recognition Process for Each Link First Group)

By the cost recognition process for each link first group, the cost FGCost(v) of the subject link first group LFG(v) is corrected to be smaller stepwise or continuously with a decrease in the curvatures of the links or connection angles between adjacent links included in a subject link first group LFG(v).

The more similar to a straight line a plurality of links included in a subject link first group LFG(v) are, the smaller the curvatures of the links or the connection angles between adjacent links included in the subject link first group LFG(v) is, and thus the cost FGCost(v) of the subject link first group LFG(v) is made small.

Consequently, a linear-shaped route can be preferentially searched for in the server route search process (STEP260).
(Cost Recognition Process for Each Link Second Group)

Now, referring to FIG. 9, the cost recognition process for each link second group (STEP400) will be described.

The server cost recognition correction element 12+ looks up the link second group information 171 to recognize each of the link second groups (STEP410). Through this step, for example, link second groups LSG(w) are recognized, which are illustrated in FIG. 10A and FIG. 10B illustrating the case of w=1 to 2 and w=11 to 12.

The server cost recognition correction element 12+ executes STEP430 to STEP450 as a loop for each link second group LSG(w) (STEP420).

The server cost recognition correction element 12+ recognizes, as the cost SGCost(w) of the subject link second group LSG(w), a total sum of the costs FGCost(v) of each link first group LFG(v) included in the subject link second group LSG(w), by the following formula (14) (STEP430).
[Formula 14]

$$SGCost(w) = \Sigma FGCost(v) \quad (14)$$

The server cost recognition correction element 12+ recognizes a group index value SGV(w) of a subject link second group LSG(w) (STEP440).

For example, the server cost recognition correction element 12+ recognizes, as the group index value SGV(w) (≥1), a value obtained by dividing the number of the link first groups LFG(v) included in the subject link second group LSG(w) by a predetermined value (a typical number of link first groups LFG(v)). The number of the link first groups LFG(v) included in a subject link second group LSG(w) corresponds to the "linear evaluation value" of the present invention.

Based on the group index value SGV(w) of the subject link second group LSG(w), the server cost recognition correction element 12+ corrects the cost SGCost(w) of the subject link second group LSG(w) in such a manner as to make the cost SGCost(w) of the subject link second group LSG(w) small stepwise or continuously with an decrease in the group index value SGV(w) (STEP450).

For example, the server cost recognition correction element 12+ corrects the cost SGCost(w) of the subject link second group LSG(w), by the following formula (15) (STEP450).
[Formula 15]

$$SGCost(w) = SGCost(w) * SGV(w) \quad (15)$$

After the process of STEP450, the server cost recognition correction element 12+ executes the next loop process.
(Effect of Executing Cost Recognition Process for Each Link Second Group)

By the cost recognition process for each link second group, the cost SGCost(w) of the subject link second group LSG(w) is corrected to be smaller stepwise or continuously with a decrease in the number of subject link first groups LFG(v) included in the subject link second group LSG(w).

Now, the link first group LFG(v) is a link group consisting of one or more links L(k) of which links adjacent to each other form a connection angle that is within a predetermined angle.

The total length of the link first groups LFG(v) included in one link second group LSG(w) is the predetermined first distance or more and less than the predetermined second distance.

Therefore, a small number of subject link first groups LFG(v) included in a subject link second group LSG(w) means that the subject link second group LSG(w) includes many links having a connection angle between the links being within a predetermined angle.

When a subject link second group LSG(w) includes many links the connection angle between which is within the predetermined angle, there is a high probability that a route formed by the links included in the subject link second group LSG(w) is substantially linear.

Therefore, when a route formed by the links included in a subject link second group LSG(w) is substantially linear, the number of the subject link first groups LFG(v) included in the subject link second group LSG(w) is small, and thus the cost SGCost(w) of the subject link second group LSG(w) is made small.

For example, as illustrated in FIG. 10B, when the number of the link first groups LFG(v) included in the link second group LSG(11) is small, the route of the link second group LSG(11) has a shape more similar to a straight line than the case of the link second group LSG(12) illustrated in FIG. 10B, where the number of the included link first groups LFG(v) is large.

That is, a linear-shaped route can be preferentially searched for in the server route search process (STEP260).
(Modified Embodiment)

The navigation client 2 may execute part of or all of the processes among STEP220 to STEP260, STEP300, and STEP400. In this case, pieces of information 162 (162+) to 171 necessary in the processing executed by the navigation client 2 need to be stored in the client storage device 26 of the navigation client 2 in advance, or need to be provided from the navigation server 1 to the navigation client 2.

What is claimed is:

1. A navigation server comprising:
    a server storage device that stores server map information in which a road is represented by a link;
    a server location recognition element that receives, through communications with a navigation client, a departure location and a destination location of a user of the navigation client which are obtained with signals received by the navigation client via a global positioning system receiver;
    a server cost recognition element that recognizes a reference segment cost of a subject segment, the subject segment being composed of one or a plurality of continuous links included in a server route candidate that is a candidate of a server route connecting a link in a vicinity of the departure location and a link in a vicinity of the destination location;
    a server cost correction element that, for at least one of a plurality of indices representing one or both of a road environment of the subject segment and a relative relationship between the subject segment and one or more of other segments included in the server route candidate, evaluates a segment cost index value representing a traffic difficulty of the subject segment, and calculates a corrected segment cost by correcting the reference segment cost of the subject segment using the segment cost index value of the subject segment; and
    a server cost information transmission element that generates and transmits, to the navigation client, a server route associated with the corrected segment cost, the server route corresponding to a most efficient route for the user of the navigation client to travel to the destination location, wherein the server cost recognition element is configured to evaluate a degree of change in road environment of the subject segment or a degree of change in road environment of the other segments with respect to the subject segment, wherein the server storage device is configured to store, as the road environment of the subject segment, curvature information on a curvature or curvature change amount of a road in each segment, wherein the server cost recognition element is configured to look up the curvature information to recognize, as the degree of change in road environment of the subject segments, an integrated value of absolute values of a number of curvatures or an integrated value of absolute values of a number of curvature change amounts, of a road in the subject segment, and to determine the segment cost index value of the subject segment so as to evaluate a segment cost of the subject segment to be higher continuously or stepwise with an increase in the integrated value of the absolute values of the curvatures or the integrated value of the absolute values of the curvature change amounts, of the road in the subject segment, and wherein the server route takes into account the degree of change in road environment of the subject segment or the degree of change in road environment of the other segments, and the curvature information.

2. The navigation server according to claim 1, wherein the server cost recognition element is configured to determine, for the subject segment, as the road environment of the subject segment, a linear evaluation value that represents whether a shape of a link included in the subject segment is similar to a linear shape and to determine, based on the linear evaluation value, the segment cost index value of the subject segment so as to evaluate a segment cost of the subject segment to be smaller continuously or stepwise as the shape of the link included in the subject segment is more similar to a linear shape.

3. The navigation server according to claim 1, wherein the server cost recognition element is configured to determine the segment cost index value of the subject segment so as to evaluate a segment cost of the subject segment to be higher continuously or stepwise with an increase in the degree of change.

4. The navigation server according to claim 3, wherein the road environment of the subject segment includes at least one of a road traffic situation, road shape, road type, road width, traffic regulation, road infrastructure, structure, and appurtenance, of the subject segment.

5. The navigation server according to claim 1, wherein the server storage device is configured to store, as the road environment of the subject segment, connection mode information on a connection mode between segments adjacent to each other, and the server cost recognition element is configured to look up the connection mode information to determine a connection mode between the subject segment and another segment adjacent to the subject segment, and to determine the segment cost index value of the subject segment in accordance with the connection mode between the subject segment and the another segment adjacent to the subject segment.

6. The navigation server according to claim 5, wherein the connection mode of the segment includes at least one of a straight ahead, a right turn, a left turn, a U-turn, and a connection angle between adjacent links.

7. The navigation server according to claim 1, wherein the server storage device is configured to store, as the road environment of the subject segment, traffic regulation information on a stop instruction or a speed restriction of each segment, and the server cost recognition element is configured to recognize, based on the traffic regulation information, a stop instruction or a speed restriction present in the subject segment, and to determine the segment cost index value in accordance with the stop instruction or the speed restriction in the subject segment.

8. The navigation server according to claim 1, wherein the server storage device is configured to store, as the road environment of the subject segment, width information that represents a width or a number of lanes of each segment, and the server cost recognition element is configured to recognize a type of the width information stored in the server storage device, and to determine a width level of the subject segment based on the type of the width information, and the width or the number of lanes of the subject segment, and determine the segment cost index value of the subject segment based on the width level of the subject segment.

9. The navigation server according to claim 1, wherein the server storage device is configured to store, as the road environment of the subject segment, road type information that represents a road type of each segment, including a first class expressway and a second class expressway different from the first class expressway, and the server cost recognition element is configured to recognize the road type of the subject segment based on the road type information, and to determine the segment cost index value of the subject segment so as to evaluate, when the road type of the subject segment is the first class expressway, a segment cost of the subject segment to be higher than when the road type of the subject segment is the second class expressway.

10. The navigation server according to claim 1, wherein the server storage device is configured to store, as the road environment of the subject segment, road infrastructure information on a road infrastructure or a structure that is provided being integrated with a road included in each segment or on an appurtenance that accompanies the road, and the server cost recognition element is configured to recognize, based on the road infrastructure information, the road infrastructure or the structure that is provided being integrated with the subject segment or the appurtenance that accompanies the subject segment, and to determine the segment cost index value of the subject segment in accordance with the recognized road infrastructure or the structure.

11. A navigation client comprising:

a client storage device that stores client map information in which a road is represented by a link;

a client location recognition element that recognizes a departure location and a destination location of a user of the navigation client which are obtained with signals received by the navigation client via a global positioning system receiver;

a client cost recognition element that recognizes a reference segment cost of a subject segment, the subject segment being composed of one or a plurality of continuous links included in a client route candidate that is a candidate of a client route connecting a link in a vicinity of the departure location and a link in a vicinity of the destination location;

a client cost correction element that, for at least one of a plurality of indices representing one or both of a road environment of the subject segment and a relative relationship between the subject segment and one or more of other segments included in the client route candidate, evaluates a segment cost index value representing a traffic difficulty of the subject segment, and calculates a corrected segment cost by correcting the reference segment cost of the subject segment using the segment cost index value of the subject segment; and a client route search element
that receives a server route associated with the corrected segment cost, the server route corresponding to a most efficient route for the user of the navigation client to travel to the destination location, and
that searches for a client route that is equivalent to the server route using the corrected segment cost, wherein the client cost recognition element is configured to evaluate a degree of change in road environment of the subject segment or a degree of change in road environment of the other segments with respect to the subject segment, wherein the client storage device is configured to store, as the road environment of the subject segment, curvature information on a curvature or curvature change amount of a road in each segment, wherein the client cost recognition element is configured to look up the curvature information to recognize, as the degree of change in road environment of the subject segments, an integrated value of absolute values of a number of curvatures or an integrated value of absolute values of a number of curvature change amounts, of a road in the subject segment, and to determine the segment cost index value of the subject segment so as to evaluate a segment cost of the subject segment to be higher continuously or stepwise with an increase in the integrated value of the absolute values of the curvatures or the integrated value of the absolute values of the curvature change amounts, of the road in the subject segment, and wherein the server route takes into account the degree of change in road environment of the subject segment or the degree of change in road environment of the other segments, and the curvature information.

12. A method performed by a computer including a storage device that stores map information in which a road is represented by a link, the method comprising:

a location recognition step for recognizing a departure location and a destination location of a user of a navigation client which are obtained with signals received by the navigation client via a global positioning system receiver;

a cost recognition step for recognizing a reference segment cost of a subject segment, the subject segment being composed of one or a plurality of continuous links included in a route candidate that is a candidate of a route connecting a link in a vicinity of the departure location and a link in a vicinity of the destination location;

a cost correction step for, for at least one of a plurality of indices representing one or both of a road environment of the subject segment and a relative relationship between the subject segment and one or more of other segments included in the route candidate, evaluating a segment cost index value representing a traffic difficulty of the subject segment, and calculating a correction segment cost by correcting the reference segment cost of the subject segment using the segment cost index value of the subject segment; and a route search step for
receiving a server route associated with the corrected segment cost, the server route corresponding to a most efficient route for the user of the navigation client to travel to the destination location, and
searching for a route that is equivalent to the server route using the corrected segment cost, wherein the cost recognition step further comprises evaluating a degree of change in road environment of the subject segment or a degree of change in road environment of the other segments with respect to the subject segment, wherein the method further comprises storing, as the road environment of the subject segment, curvature information on a curvature or curvature change amount of a road in each segment, wherein the cost recognition step further comprises looking up the curvature information to recognize, as the degree of change in road environment of the subject segments, an integrated value of absolute values of a number of curvatures or an integrated value of absolute values of a number of curvature change amounts, of a road in the subject segment, and to determine the segment cost index value of the subject segment so as to evaluate a segment cost of the subject segment to be higher continuously or stepwise with an increase in the integrated value of the absolute values of the curvatures or the integrated value of the absolute values of the curvature change amounts, of the road in the subject segment, and wherein the server route takes into account the degree of change in road environment of the subject segment or the degree of change in road environment of other segments, and the curvature information.

* * * * *